US011314504B2

(12) United States Patent
Ware et al.

(10) Patent No.: US 11,314,504 B2
(45) Date of Patent: Apr. 26, 2022

(54) MULTIPLIER-ACCUMULATOR PROCESSING PIPELINES AND PROCESSING COMPONENT, AND METHODS OF OPERATING SAME

(71) Applicant: Flex Logix Technologies, Inc., Mountain View, CA (US)

(72) Inventors: Frederick A. Ware, Los Altos Hills, CA (US); Cheng C. Wang, San Jose, CA (US); Valentin Ossman, Livermore, CA (US)

(73) Assignee: Flex Logix Technologies, Inc., Mountain View, CA (US)

( * ) Notice: Subject to any disclaimer, the term of this patent is extended or adjusted under 35 U.S.C. 154(b) by 141 days.

(21) Appl. No.: 16/816,164

(22) Filed: Mar. 11, 2020

(65) Prior Publication Data
US 2020/0326939 A1 Oct. 15, 2020

Related U.S. Application Data

(60) Provisional application No. 62/831,413, filed on Apr. 9, 2019.

(51) Int. Cl.
*G06F 9/30* (2018.01)
(52) U.S. Cl.
CPC .................................. *G06F 9/3001* (2013.01)
(58) Field of Classification Search
CPC ........................................................ G06F 9/3001
See application file for complete search history.

(56) References Cited

U.S. PATENT DOCUMENTS

| 4,958,312 A | 9/1990 | Ang et al. |
| 6,115,729 A | 9/2000 | Matheny et al. |

(Continued)

FOREIGN PATENT DOCUMENTS

| EP | 0405726 | 3/1999 |
| EP | 2280341 | 6/2013 |
| WO | WO 2018/126073 | 7/2018 |

OTHER PUBLICATIONS

Agrawal et al., "A 7nm 4-Core AI Chip with 25.6TFLOPS Hybrid FP8 Training, 102.4TOPS INT4 Inference and Workload-Aware Throttling", ISSCC, pp. 144-145, 2021.

(Continued)

*Primary Examiner* — Michael D. Yaary
(74) *Attorney, Agent, or Firm* — Neil A. Steinberg

(57) ABSTRACT

An integrated circuit including a plurality of processing components, including first and second processing components, wherein each processing component includes first memory to store image data and a plurality of multiplier-accumulator execution pipelines, wherein each multiplier-accumulator execution pipeline includes a plurality of multiplier-accumulator circuits to, in operation, perform multiply and accumulate operations using data from the first memory and filter weights. The first processing component is configured to process all of the data associated with all of stages of a first image frame via the plurality of multiplier-accumulator execution pipelines of the first processing component. The second processing component is configured to process all of the data associated with all of stages of a second image frame via the plurality of multiplier-accumulator execution pipelines of the second processing component, wherein the first image frame and the second image frame are successive image frames.

29 Claims, 28 Drawing Sheets

(56) References Cited

U.S. PATENT DOCUMENTS

| | | |
|---|---|---|
| 6,148,101 A | 11/2000 | Tanaka et al. |
| 6,298,366 B1 | 10/2001 | Gatherer et al. |
| 7,107,305 B2 | 9/2006 | Deng et al. |
| 7,299,342 B2 | 11/2007 | Nilsson et al. |
| 7,346,644 B1 | 3/2008 | Langhammer et al. |
| 7,698,358 B1 | 4/2010 | Langhammer et al. |
| 8,051,124 B2 | 11/2011 | Salama et al. |
| 8,645,450 B1 | 2/2014 | Choe et al. |
| 8,751,551 B2 | 6/2014 | Streicher |
| 8,788,562 B2 | 7/2014 | Langhammer et al. |
| 2003/0172101 A1 | 9/2003 | Liao et al. |
| 2007/0239967 A1 | 10/2007 | Dally et al. |
| 2009/0094303 A1 | 4/2009 | Katayama |
| 2014/0019727 A1 | 1/2014 | Zhu et al. |
| 2017/0115958 A1 | 4/2017 | Langhammer |
| 2017/0116693 A1 | 4/2017 | Rae et al. |
| 2017/0214929 A1 | 7/2017 | Susnow et al. |
| 2017/0322813 A1 | 11/2017 | Langhammer |
| 2017/0344876 A1 | 11/2017 | Brothers |
| 2018/0052661 A1 | 2/2018 | Langhammer |
| 2018/0081632 A1 | 3/2018 | Langhammer |
| 2018/0081633 A1 | 3/2018 | Langhammer |
| 2018/0189651 A1 | 7/2018 | Henry et al. |
| 2018/0300105 A1 | 10/2018 | Langhammer |
| 2018/0314492 A1* | 11/2018 | Fais .................. G06T 1/20 |
| 2018/0321909 A1 | 11/2018 | Langhammer |
| 2018/0321910 A1 | 11/2018 | Langhammer et al. |
| 2018/0341460 A1 | 11/2018 | Langhammer |
| 2018/0341461 A1 | 11/2018 | Langhammer |
| 2019/0042191 A1 | 2/2019 | Langhammer |
| 2019/0042244 A1* | 2/2019 | Henry .................. G06F 7/483 |
| 2019/0079728 A1 | 3/2019 | Langhammer et al. |
| 2019/0196786 A1 | 6/2019 | Langhammer |
| 2019/0243610 A1 | 8/2019 | Lin et al. |
| 2019/0250886 A1 | 8/2019 | Langhammer |
| 2019/0286417 A1 | 9/2019 | Langhammer |
| 2019/0310828 A1 | 10/2019 | Hammer et al. |
| 2019/0324722 A1 | 10/2019 | Langhammer |
| 2020/0004506 A1 | 1/2020 | Langhammer et al. |
| 2020/0026493 A1 | 1/2020 | Streicher et al. |
| 2020/0174750 A1 | 6/2020 | Langhammer |
| 2020/0326948 A1 | 10/2020 | Langhammer |

OTHER PUBLICATIONS

Linley Gwennap, "IBM Demonstrates New AI Data Types", Microprocessor Report, Apr. 2021.

Choi et al., "Accurate and Efficient 2-Bit Quantized Neural Networks", Proceedings of $2^{nd}$ SysML Conf, 2019, 12 pages.

Sun et al., "Hybrid 8-bit Floating Point (HFP8) Training and Inference for Deep Neural Networks", NeurIPS 2019, 10 pages.

"NVidia A100 Tensor Core GPU Architecture", v1.0, 2020, 82 pages.

Papadantonakis et al., "Pipelining Saturated Accumulation", IEEE, vol. 58, No. 2, pp. 208-219, Feb. 2009.

Priyanka Nain, "Multiplier-Accumulator (MAC) Unit", IJDACR, vol. 5, Issue 3, Oct. 2016, 4 pages.

Jebashini et al., "A Survey and Comparative Analysis of Multiply-Accumulate (MAC) Block for Digital Signal Processing Application on ASIC and FPGA", Journal of Applied Science, vol. 15, Issue 7, pp. 934-946, Jul. 2015.

International Search Report and Written Opinion of International Searching Authority re: re: PCT/US2020/024808, dated Jul. 29, 2020, 11 pages.

Invitation to Pay Additional Fees of International Searching Authority re: PCT/U82020/024808, dated Jun. 4, 2020, 2 pages.

\* cited by examiner

Pseudo-code

```
For i=0,Dw-1,1
  For j=0,Dh-1,1
    For l=0,Yd-1,1
      Yijl ← 0
      For k=0,Dd-1,1
        Yijl ← (Dijk * Fkl) + Yijl
```

Operation count:

[0] Fkl weight inputs (L1 -> L0)   $D_D * Y_D$
[1] Dijk input    (L2 -> pipeline)   $D_W * D_H * D_D$
[2] MAC ops            $D_W * D_H * D_D * Y_D$
[3] Yijl outputs      (pipeline -> L2)   $Y_W * Y_H * Y_D$

FIG. 1B

Pseudo-code

```
For i=0,Dw-1,1
  For j=0,Dh-1,1
    For l=0,Yd-1,1
      Yijl ← 0
      For k=0,Dd-1,1
        For m=0, (M*M)-1   // M*M = 3x3
          Uijklm ← MUL_M (Dijkm,Fklm)
          Vijkl  ← ∑_M    (Uijklm)
          Yijl   ← ∑_K    (Vijkl)
```

Summary of operations:

[1] Dijk input           $D_W * D_H * D_D$
[2] Yijl outputs         $Y_W * Y_H * Y_D$
[3] Fxy weight inputs    $D_D * Y_D * M*M$
[4] MAC multiply ops     $D_W * D_H * D_D * Y_D * M*M$     $M*M = 3x3$

FIG. 4B

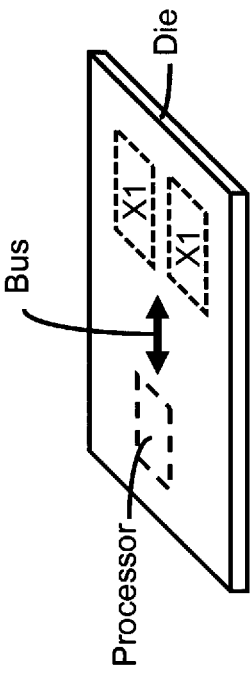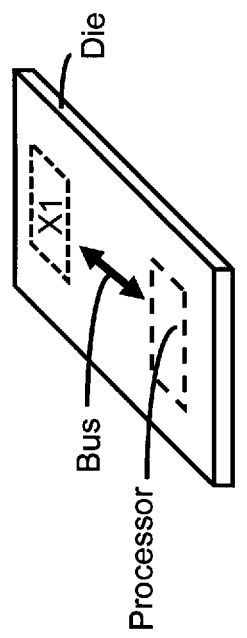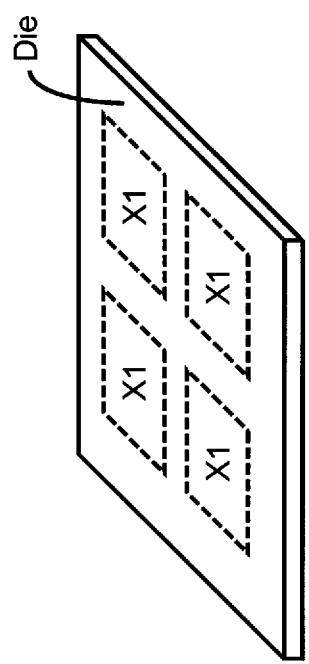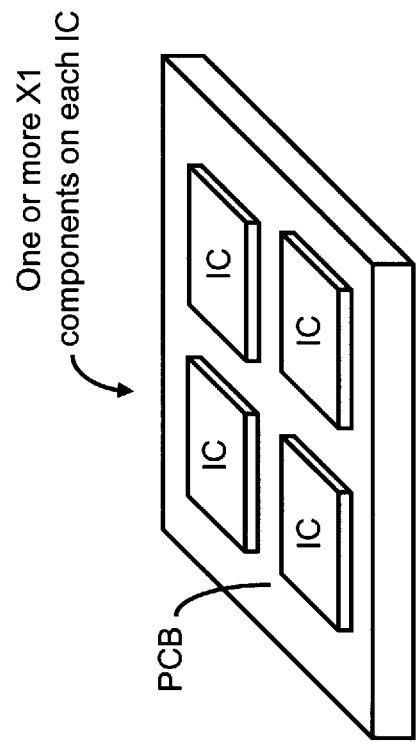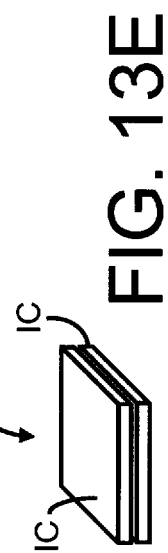
FIG. 13A
FIG. 13B
FIG. 13C
FIG. 13D
FIG. 13E

MULTIPLIER-ACCUMULATOR PROCESSING PIPELINES AND PROCESSING COMPONENT, AND METHODS OF OPERATING SAME

RELATED APPLICATION

This non-provisional application claims priority to and the benefit of U.S. Provisional Application No. 62/831,413, entitled "Multiplier-Accumulator Circuitry and System having Processing Pipeline and Methods of Operating and Using Same", filed Apr. 9, 2019. The '413 provisional application is hereby incorporated herein by reference in its entirety.

INTRODUCTION

There are many inventions described and illustrated herein. The present inventions are neither limited to any single aspect nor embodiment thereof, nor to any combinations and/or permutations of such aspects and/or embodiments. Importantly, each of the aspects of the present inventions, and/or embodiments thereof, may be employed alone or in combination with one or more of the other aspects of the present inventions and/or embodiments thereof. All combinations and permutations thereof are intended to fall within the scope of the present inventions.

In one aspect, the present inventions are directed to one or more integrated circuits having multiplier-accumulator circuitry (and methods of operating such circuitry) including a plurality of multiplier-accumulator execution or processing pipelines wherein each pipeline includes a plurality of multiplier-accumulator circuits that function or operate concurrently. Here, the multiplier-accumulator execution or processing pipelines concurrently process related data (e.g., image data) via the plurality of separate multiplier-accumulator circuits (referred to herein, at times, as "MAC" or "MAC circuits") and, in one embodiment, a plurality of registers (including a plurality of shadow registers) that facilitate pipelining of the multiply and accumulate operations to increase throughput of the multiplier-accumulator execution or processing pipelines in connection with processing the related data.

In one embodiment, the one or more integrated circuits each include a plurality of clusters (e.g., four) wherein each cluster includes a plurality of MAC execution pipelines (e.g., 16) wherein each MAC execution pipeline includes a plurality of separate multiplier-accumulator circuits (e.g., 64). Here, the plurality of clusters may form a component (such component is often identified in the figures as "X1" or "X1 component") that includes, in one embodiment, memory, a switch interconnect network to interconnect circuitry of the component (e.g., MAC execution pipeline(s) of the cluster(s) of the X1 component) and/or interconnect circuitry of the component with circuitry of one or more other X1 components, and interface circuitry (e.g., PHY and/or GPIO circuitry) to interface with, for example, external memory (e.g., DRAM, MRAM, SRAM and/or Flash memory).

In one embodiment, one or more MAC execution pipelines of a plurality of clusters of a X1 component may be configured to concurrently process related data (e.g., image data) via the plurality of separate multiplier-accumulator circuits of each MAC execution pipeline. Notably, the MAC execution pipeline may be any size (e.g., 16, 32, 64, 96 or 128 multiplier-accumulator circuits)—which may be fixed (e.g., at manufacture) or configurable (e.g., one-time configurable or multiple-time configurable (e.g., at power-up and/or in situ).

In another aspect of the present inventions, the one or more integrated circuits include a plurality of components or X1 components (e.g., 2, 4, . . . ), wherein each component includes a plurality of the clusters wherein each cluster includes a plurality of MAC execution pipelines. For example, in one embodiment, one integrated circuit includes a plurality of components or X1 components (e.g., 4 clusters) wherein each cluster includes a plurality of execution or processing pipelines (e.g., 16, 32 or 64) which are configured to process, function and/or operate concurrently such that related data is processed by each of the execution pipelines of a plurality of the clusters concurrently to, for example, decrease the processing time of the related data and/or increase data throughput of the X1 components.

Indeed, in one embodiment, a plurality of execution or processing pipelines of each of the clusters of a plurality of the X1 components may be interconnected, for example, in a ring configuration or architecture to concurrently process related data (e.g., image data). Here, a plurality of MAC execution pipelines of one or more (or all) of the clusters of a plurality of X1 components (which may be integrated/ manufactured on a single die or multiple dice) may be interconnected in a ring configuration or architecture to concurrently process related data. For example, a plurality of MAC execution pipelines of one or more (or all) of the clusters of each X1 component are configured to process one or more stages of an image frame such that circuitry of each X1 component processes one or more stages of each image frame of a plurality of image frames. In another embodiment, a plurality of MAC execution pipelines of one or more (or all) of the clusters of each X1 component are configured to process one or more portions of each stage of each image frame such that circuitry of each X1 component is configured to process a portion of each stage of each image frame of a plurality of image frames. In yet another embodiment, a plurality of MAC execution pipelines of one or more (or all) of the clusters of each X1 component are configured to process all of the stages of at least one entire image frame such that circuitry of each X1 component is configured to process all of the stage of at least one image frame. Here, each X1 component is configured to process all of the stages of one or more image frames such that the circuitry of each X1 component processes a different image frame.

Notably, the present inventions may include a plurality of separate multiplier-accumulator circuits and a plurality of registers (including a plurality of shadow registers) that facilitate pipelining of the multiply and accumulate operations. (See, e.g., U.S. patent application Ser. No. 16/545,345 and U.S. Provisional Patent Application No. 62/725,306, entitled "Multiplier-Accumulator Circuit, Logic Tile Architecture for Multiply-Accumulate, and IC including Logic Tile Array", filed Aug. 31, 2018 and Aug. 20, 2019, respectively). Moreover, the switch interconnect network of each X1 component may employ the NLINX interface connector and interconnect network described and/or illustrated in the '306 and '345 applications. Indeed, the present inventions may be implemented in conjunction with the inventions and/or embodiments of the '306 and '345 applications, which are hereby incorporated by reference herein in their entirety. Notably, the multiplier-accumulator circuitry described and/or illustrated in the '306 and '345 applications facilitate concatenating the multiply and accumulate operations, and reconfiguring the circuitry thereof and operations performed thereby; in this way, a plurality of multiplier-accumulator circuits may be configured and/or re-configured to process data (e.g., image data) in a manner whereby the processing and operations are performed more rapidly and/or efficiently.

In addition thereto, the present inventions may also be employed or be implemented in conjunction with the circuitry and techniques multiplier-accumulator execution or processing pipelines (and methods of operating such circuitry) having circuitry to implement Winograd type processes to increase data throughput of the multiplier-accumulator circuitry and processing—for example, as described and/or illustrated in U.S. patent application Ser. No. 16/796,111 and U.S. Provisional Patent Application No. 62/823,161, filed Feb. 20, 2020 and Mar. 25, 2019, respectively); the '111 and '161 applications are hereby incorporated by reference herein in their entirety.

Notably, the integrated circuit may be, for example, a processor, controller, state machine, gate array, system-on-chip (SOC), programmable gate array (PGA) and/or FPGA.

BRIEF DESCRIPTION OF THE DRAWINGS

The present inventions may be implemented in connection with embodiments illustrated in the drawings hereof. These drawings show different aspects of the present inventions and, where appropriate, reference numerals, nomenclature, or names illustrating like circuits, architectures, structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment(s).

Notably, the configurations, block/data width, data path width, bandwidths, data lengths, values, processes, pseudo-code, operations, and/or algorithms described herein and/or illustrated in the FIGURES, and text associated therewith, are exemplary. Indeed, the inventions are not limited to any particular or exemplary circuit, logical, block, functional and/or physical diagrams, number of multiplier-accumulator circuits employed in an execution pipeline, number of execution pipelines employed in a particular processing configuration, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams. Moreover, although the illustrative/exemplary embodiments include a plurality of memories (e.g., L3 memory, L2 memory, L1 memory, L0 memory) which are assigned, allocated and/or used to store certain data and/or in certain organizations, one or more of memories may be added, and/or one or more memories may be omitted and/or combined/consolidated—for example, the L3 memory or L2 memory, and/or the organizations may be changed. Again, the inventions are not limited to the illustrative/exemplary embodiments set forth herein.

Figure 1A:
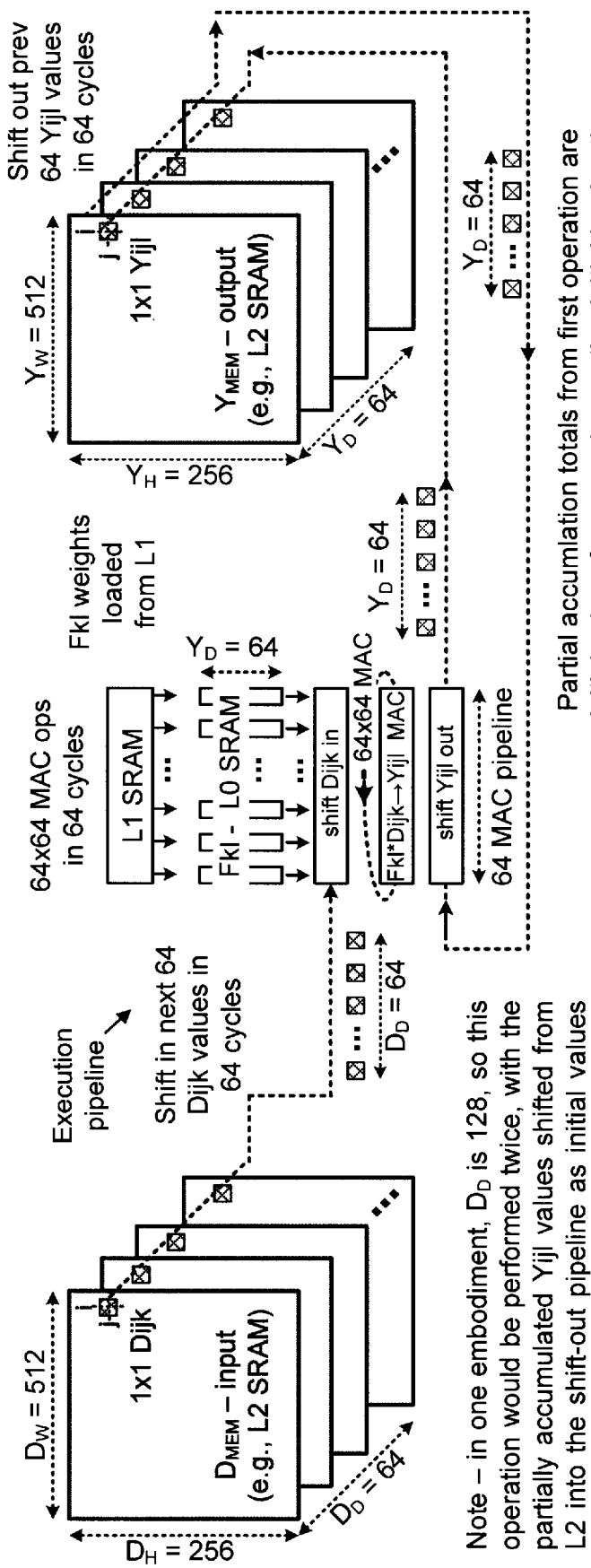
Figure 1C:
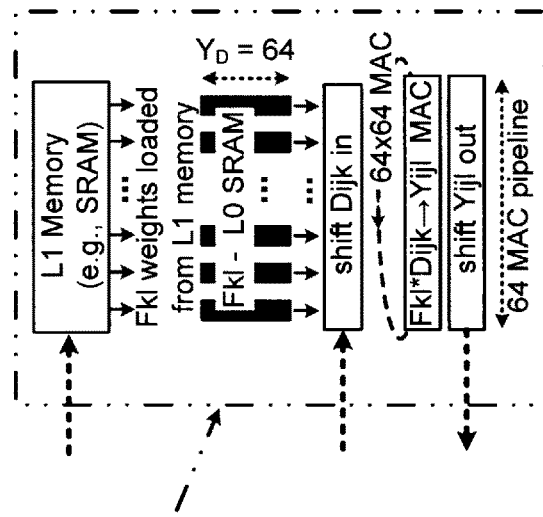
Figure 2A:
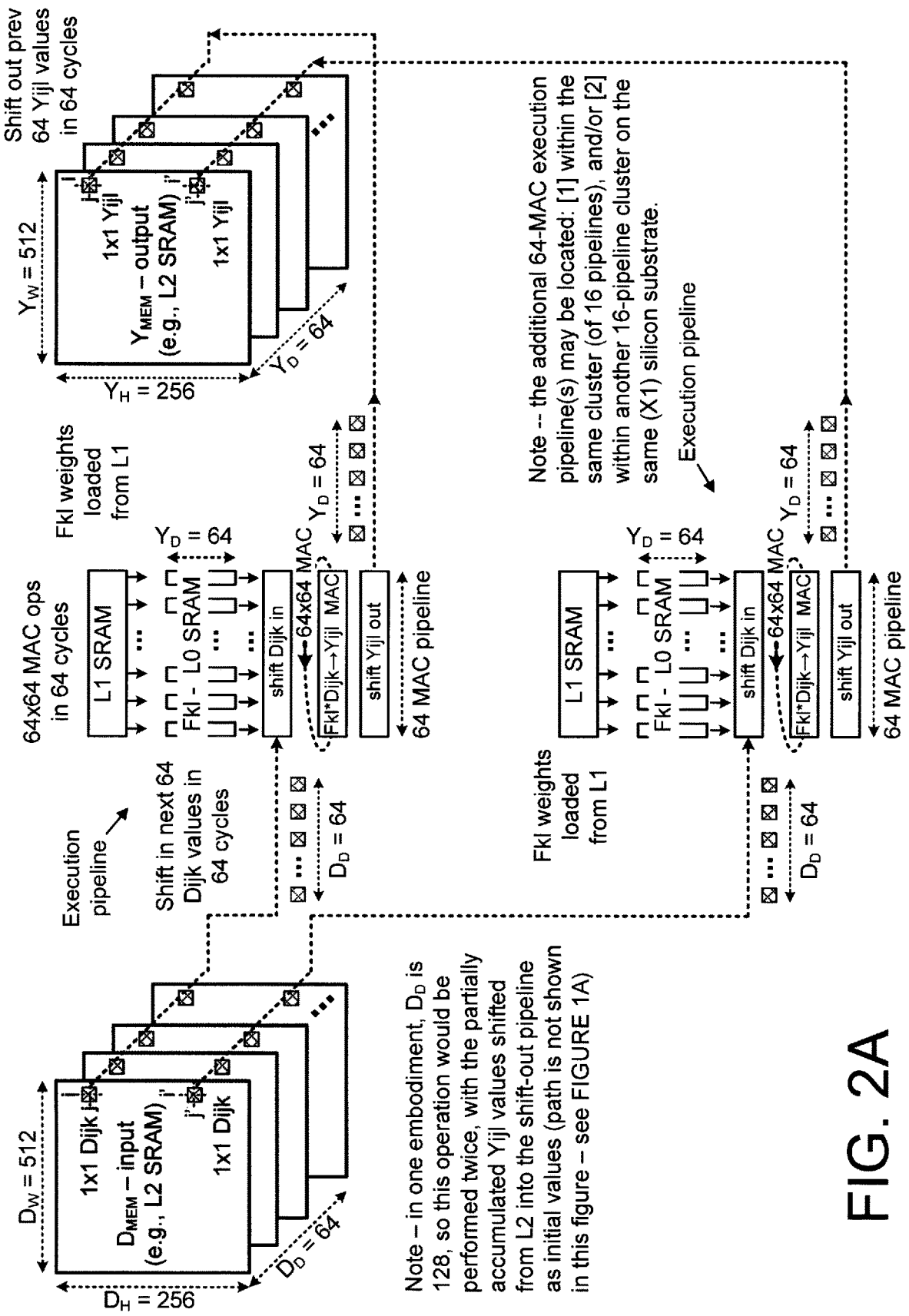
Figure 2B:
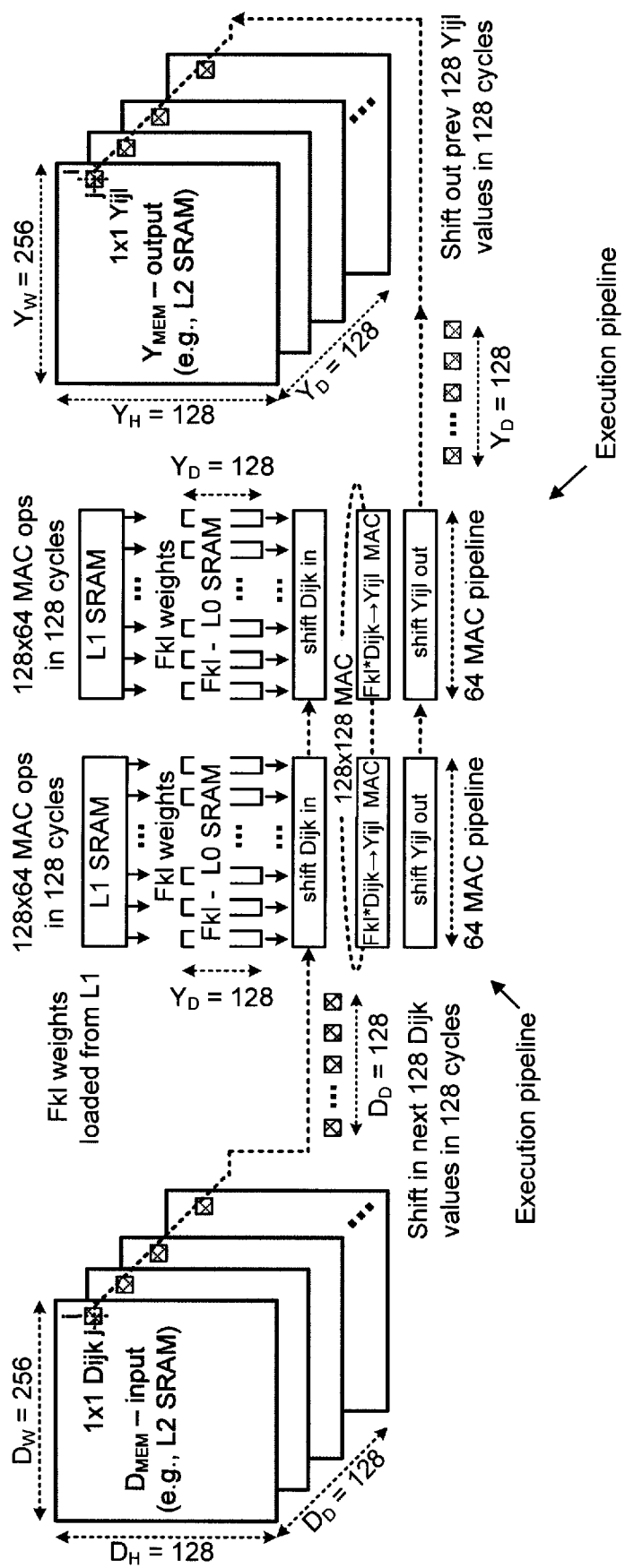
Figure 3:
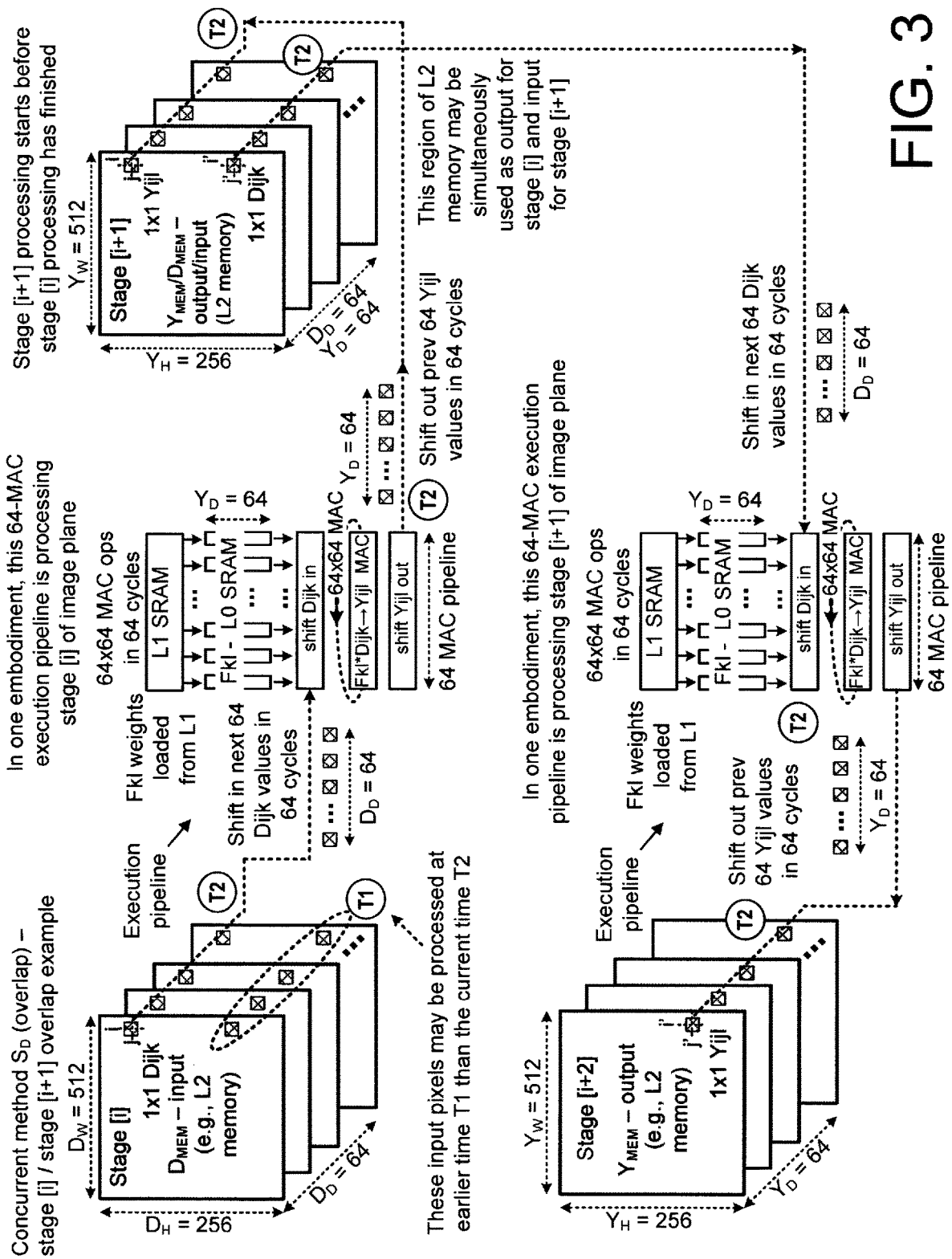
Figure 4A:
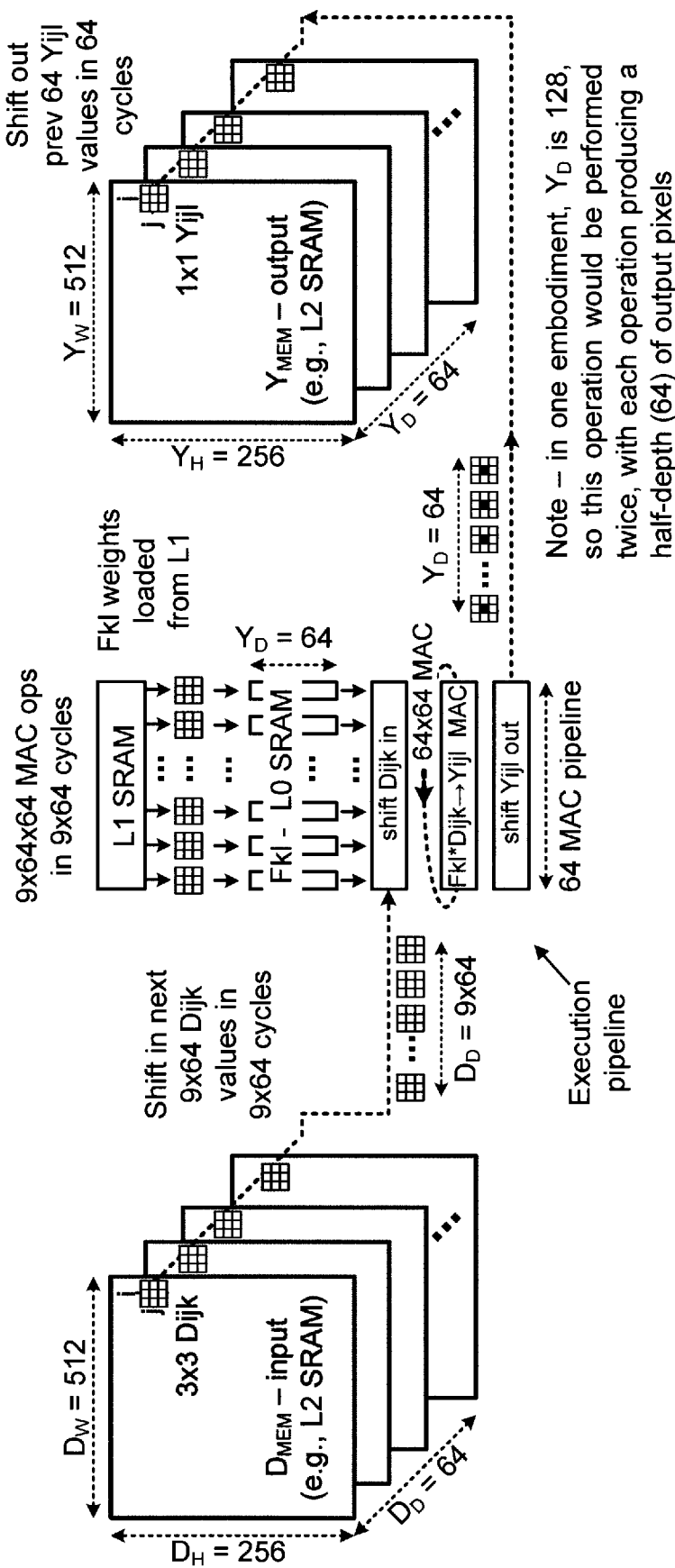
Figure 5:
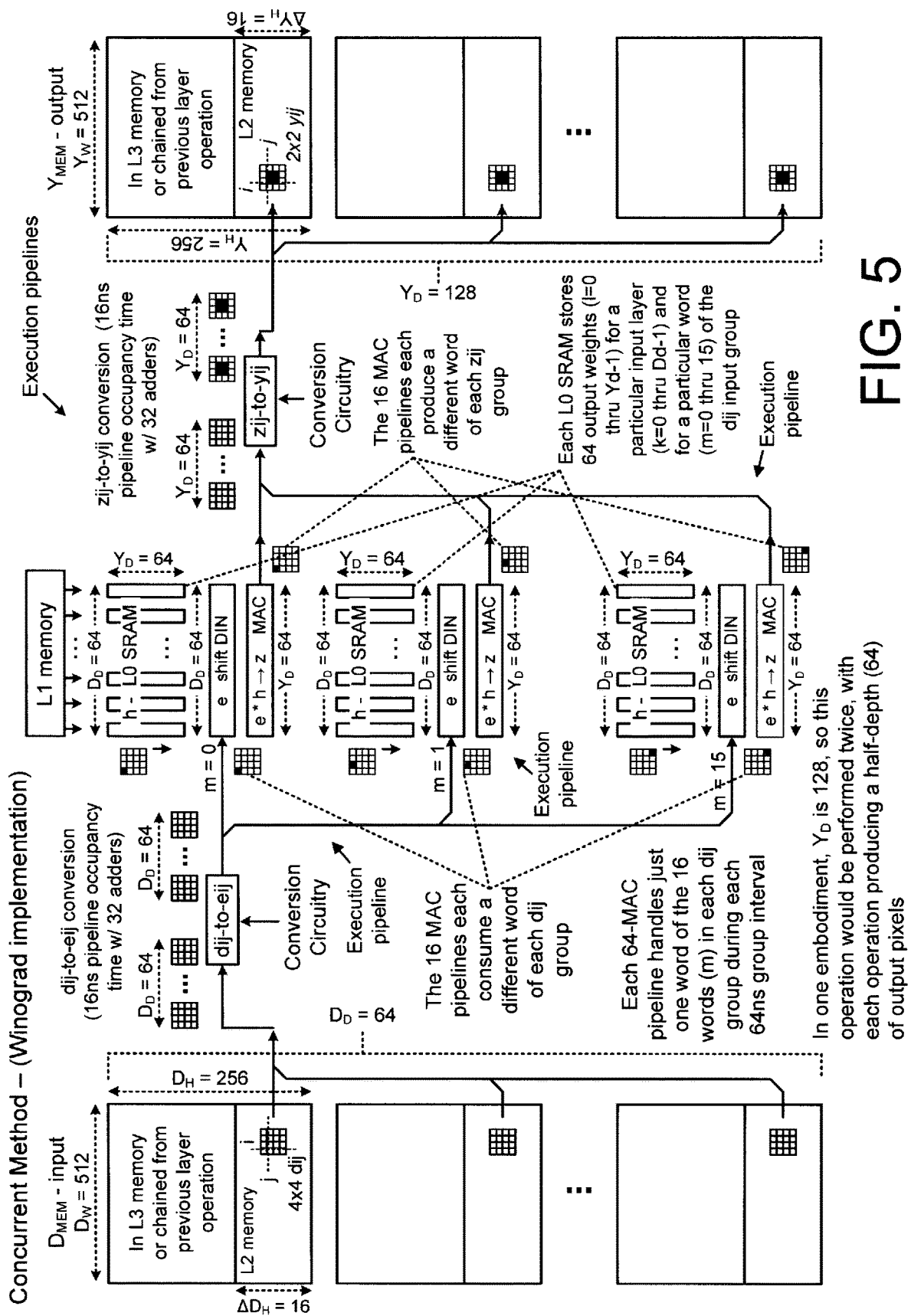
Figure 6A:
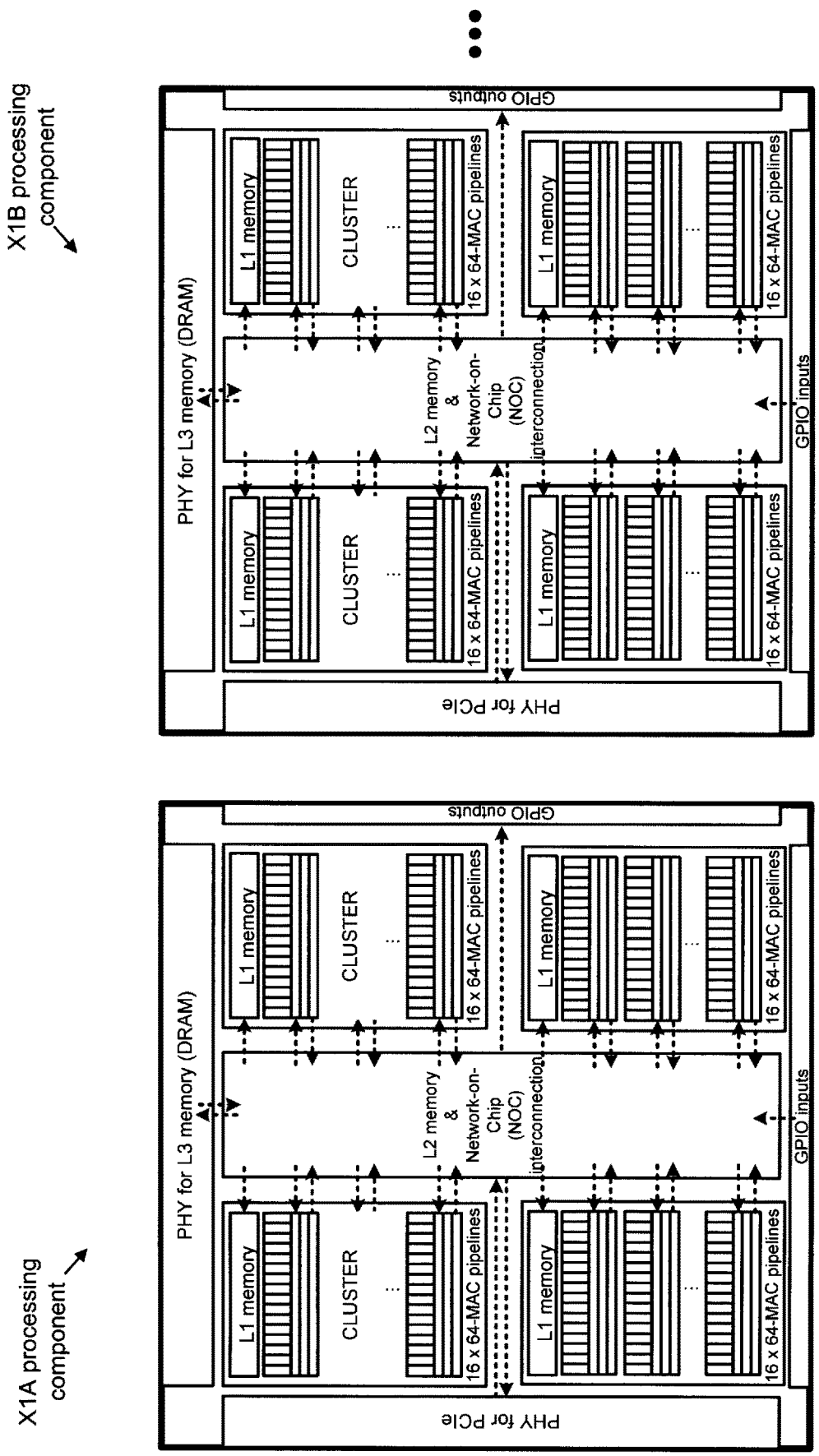
Figure 6B:
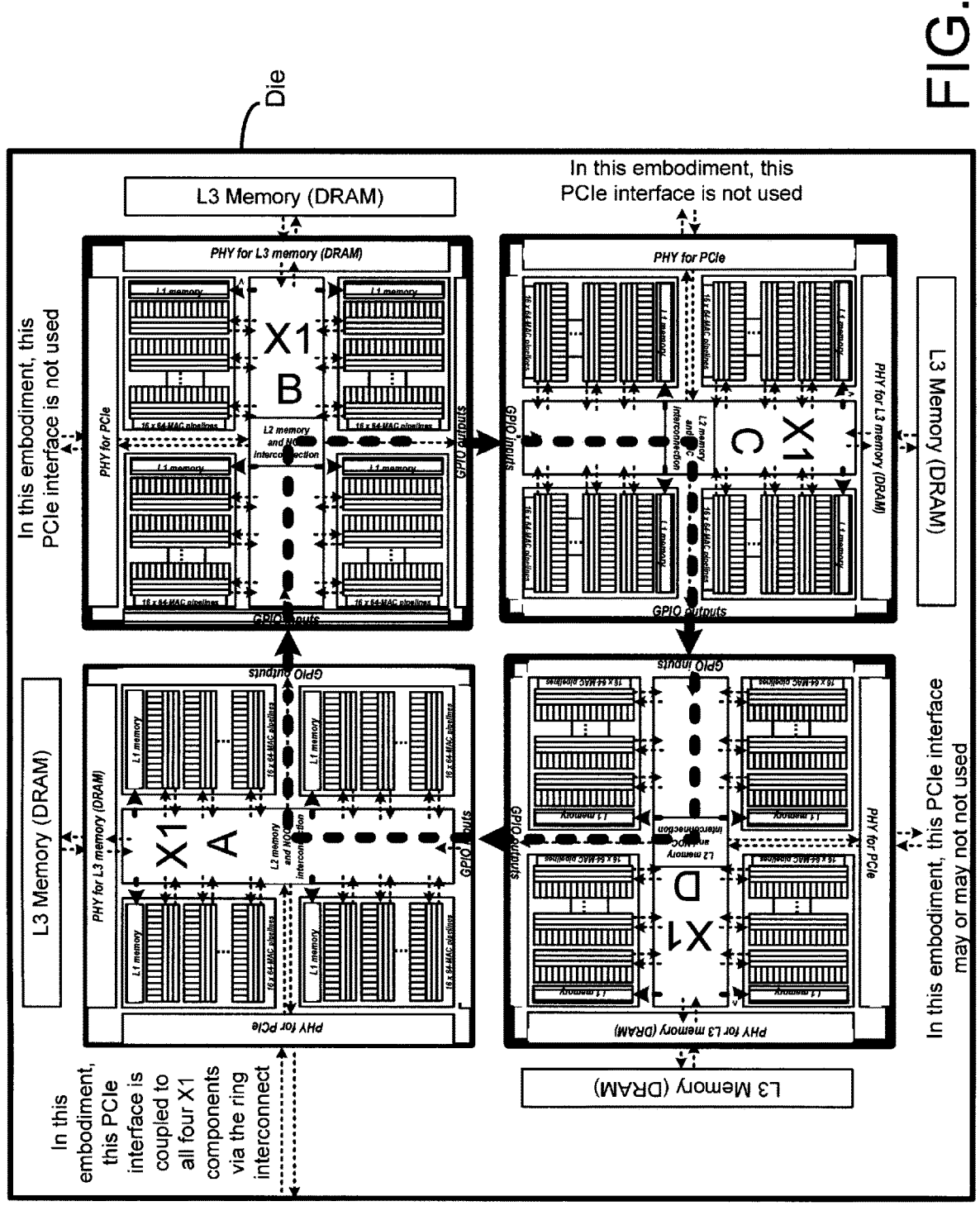
Figure 6C:
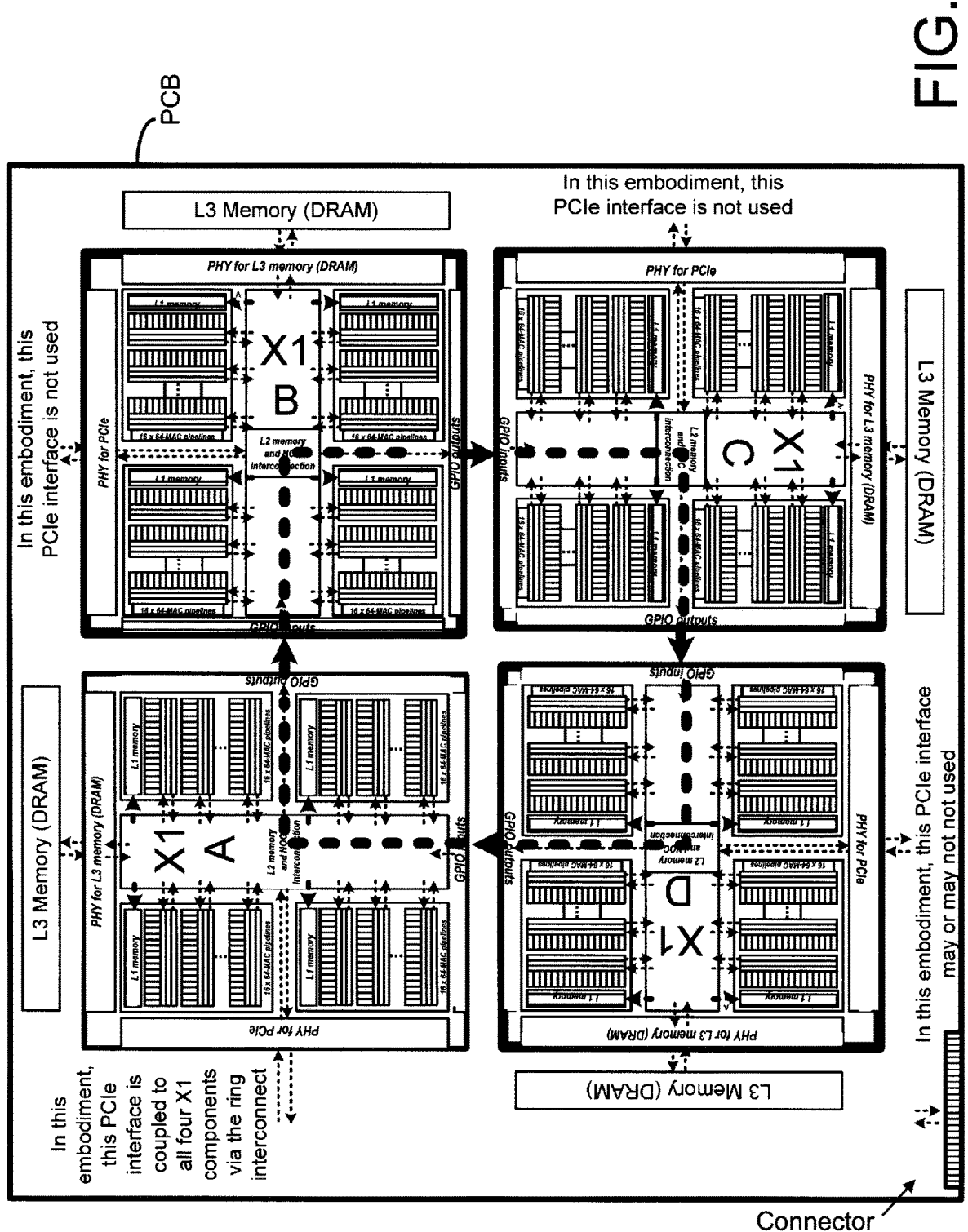
Figure 7A:
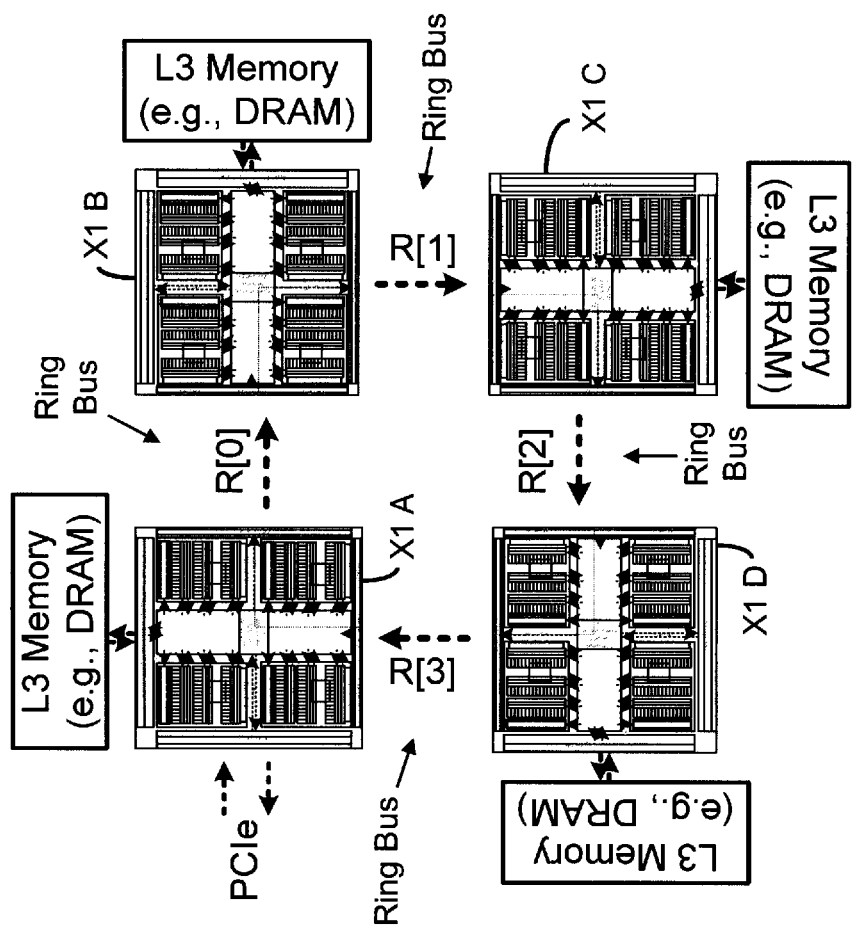
Figure 7B:
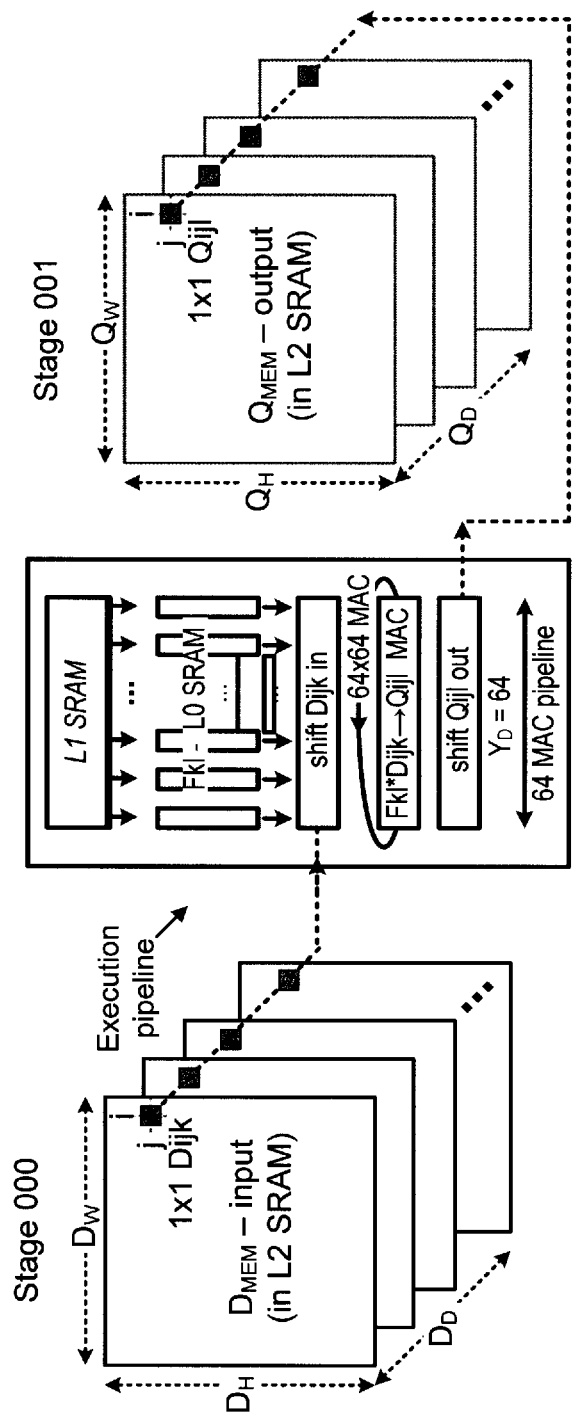
Figure 7C:
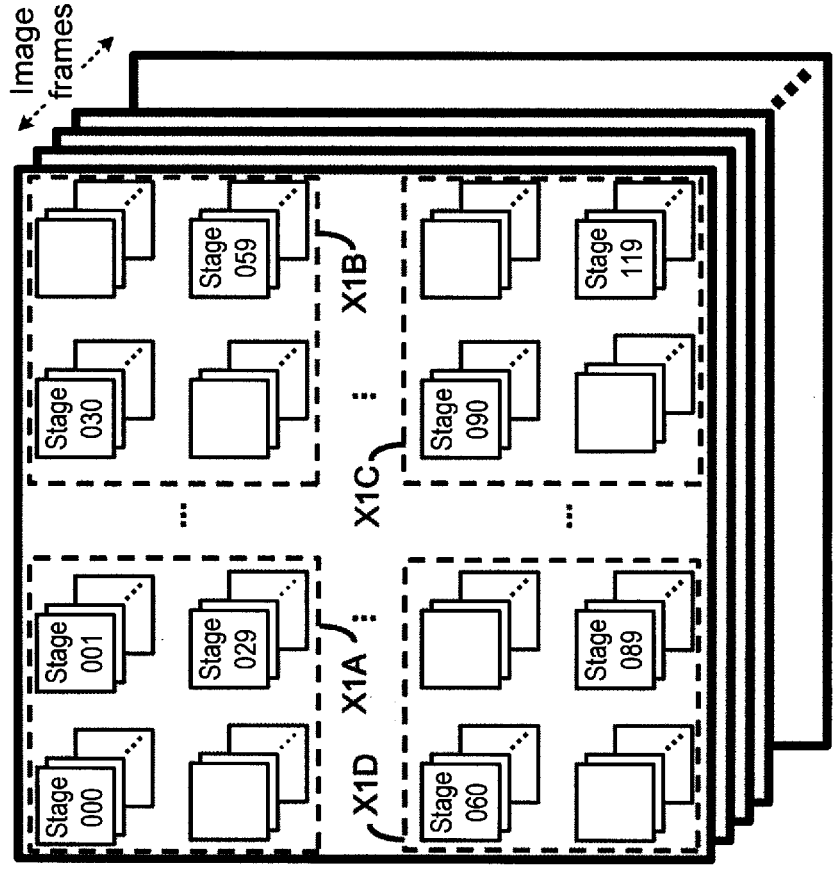
Figure 7D:
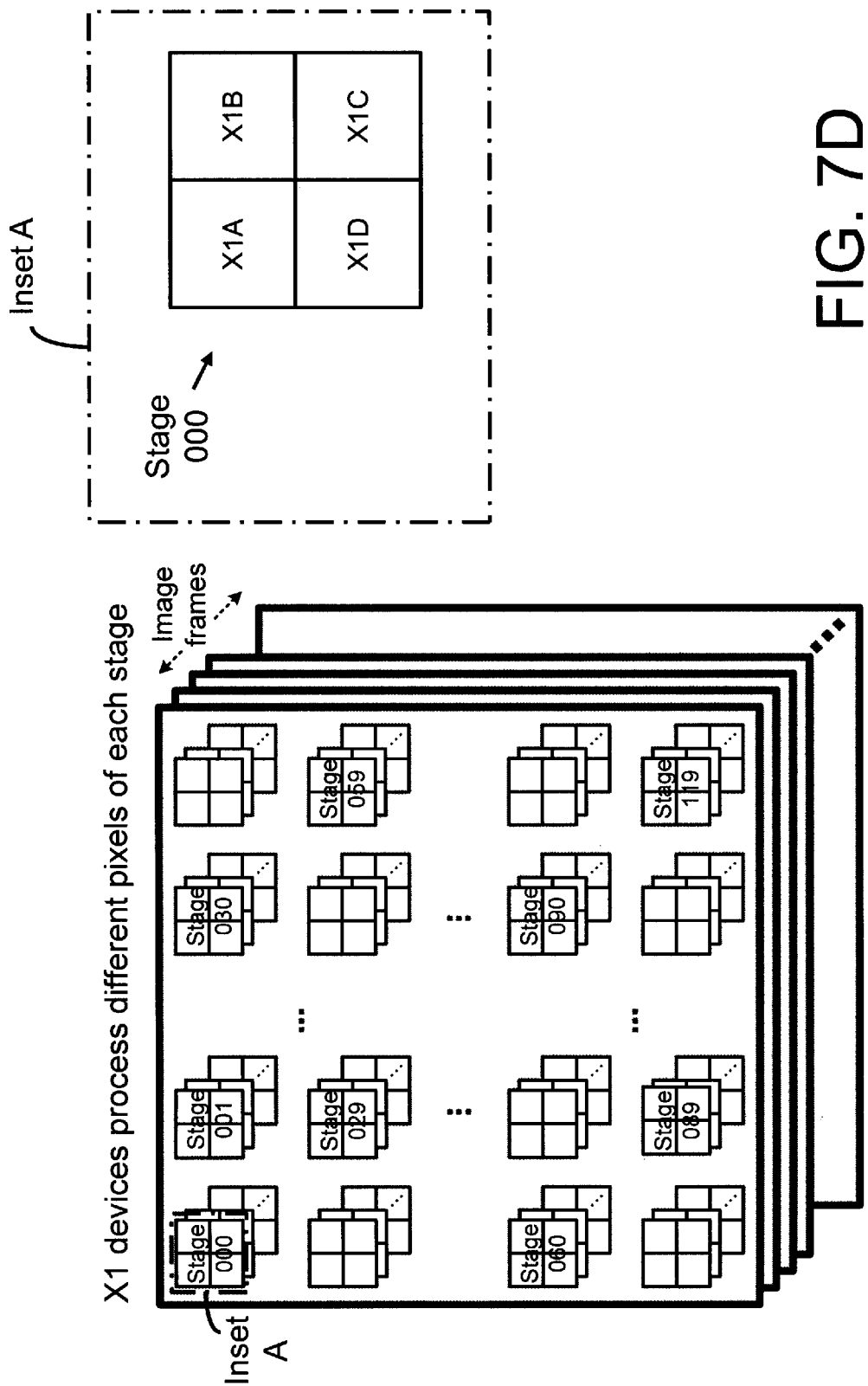
Figure 7E:
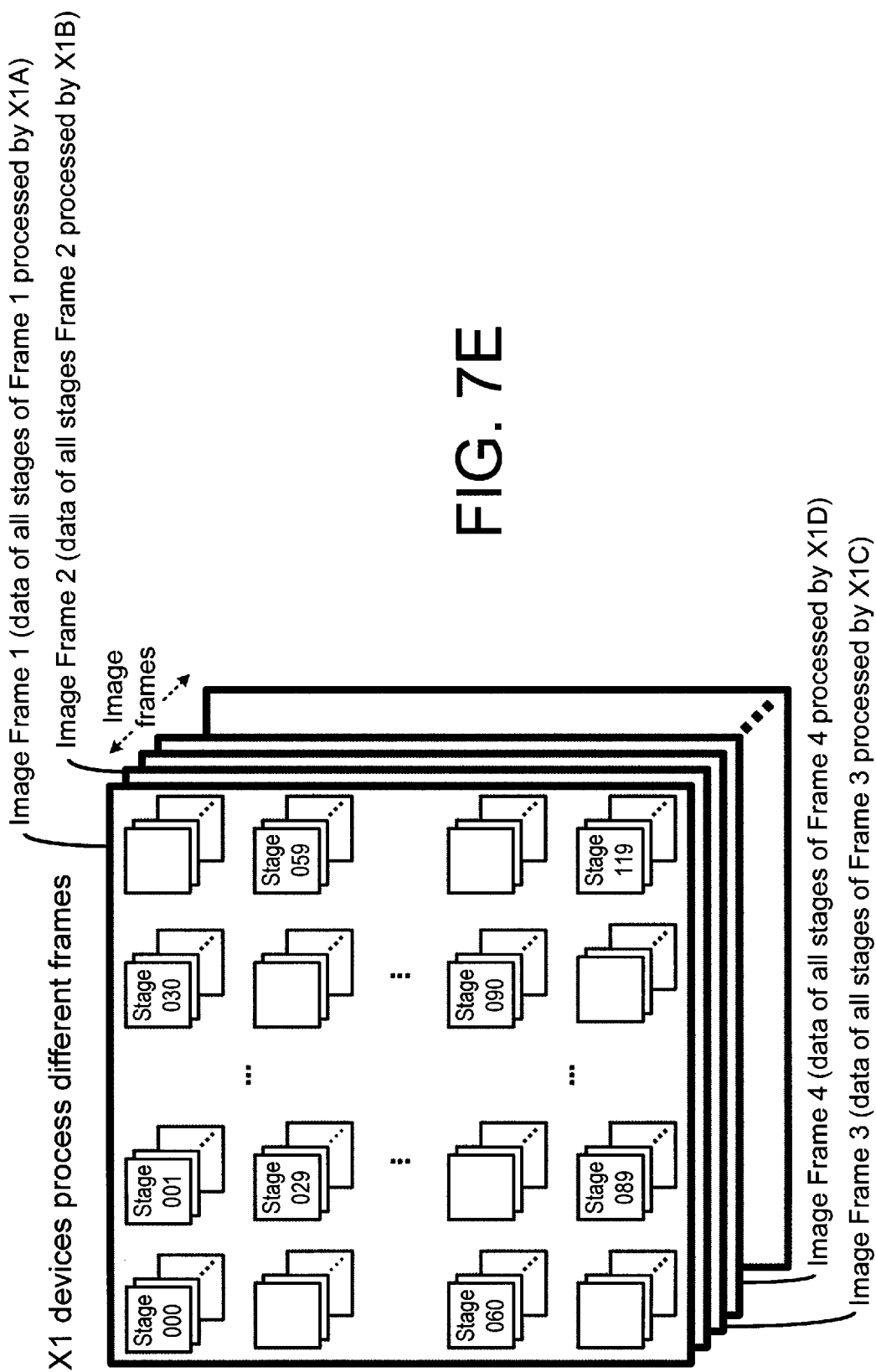
Figure 8A:
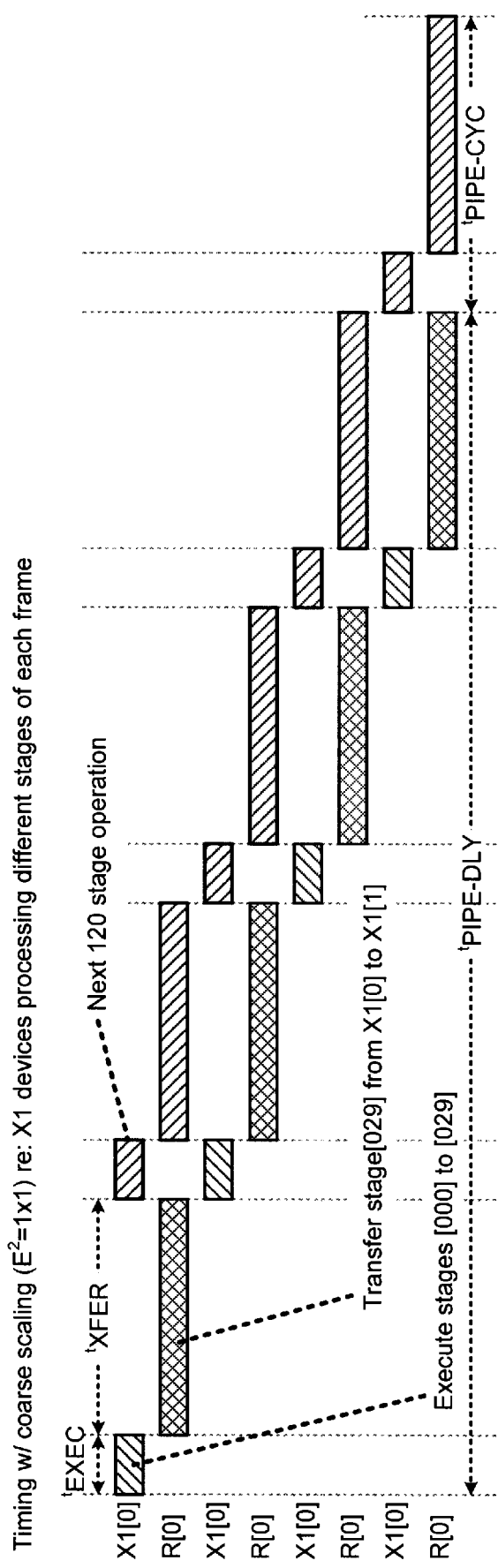
Figure 8C:
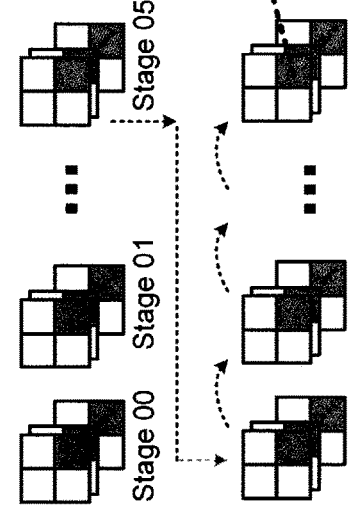
Figure 8B:
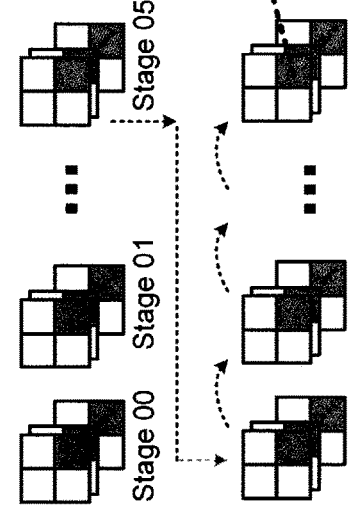
Figure 9A:
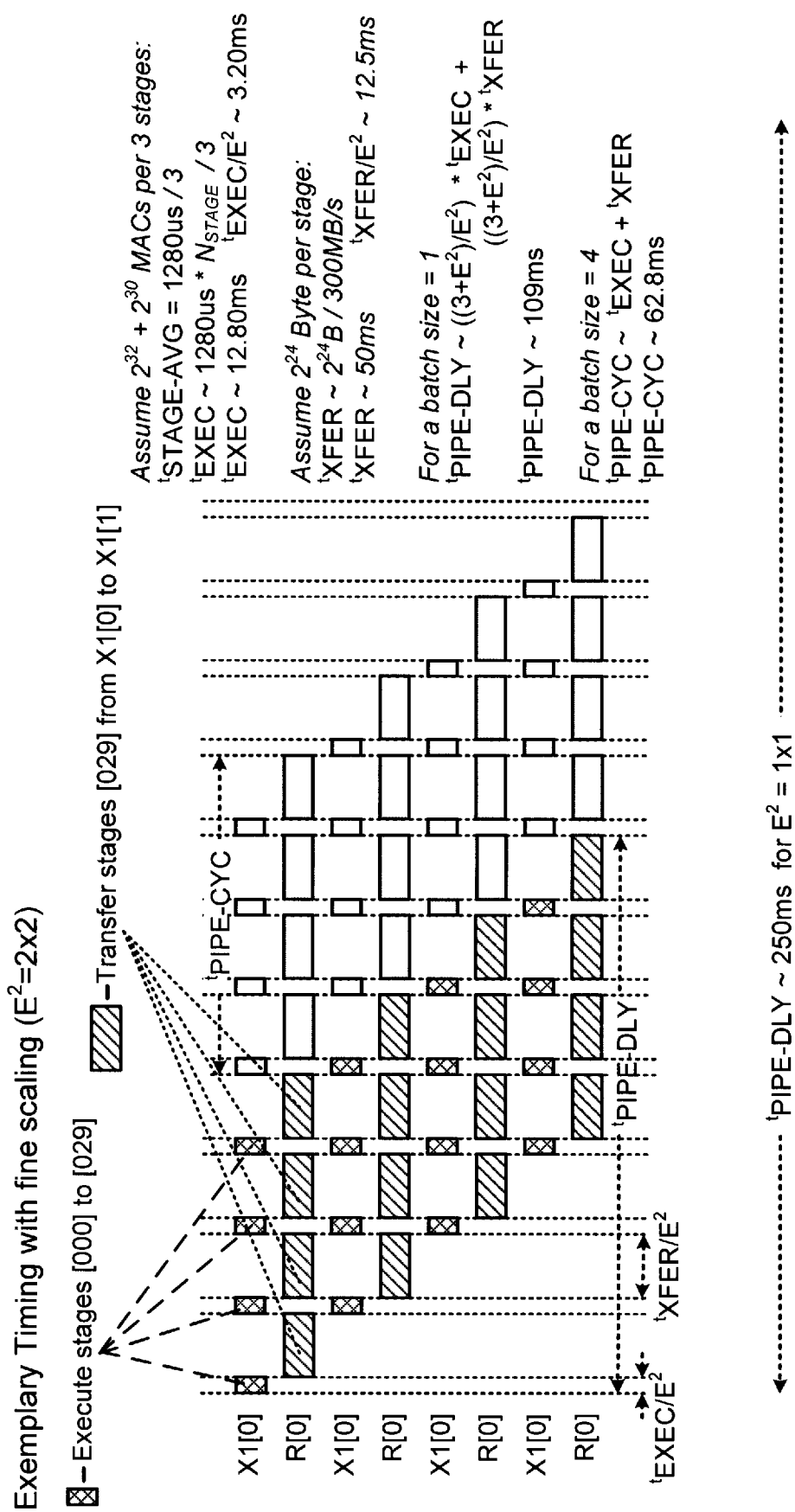
Figure 9B:
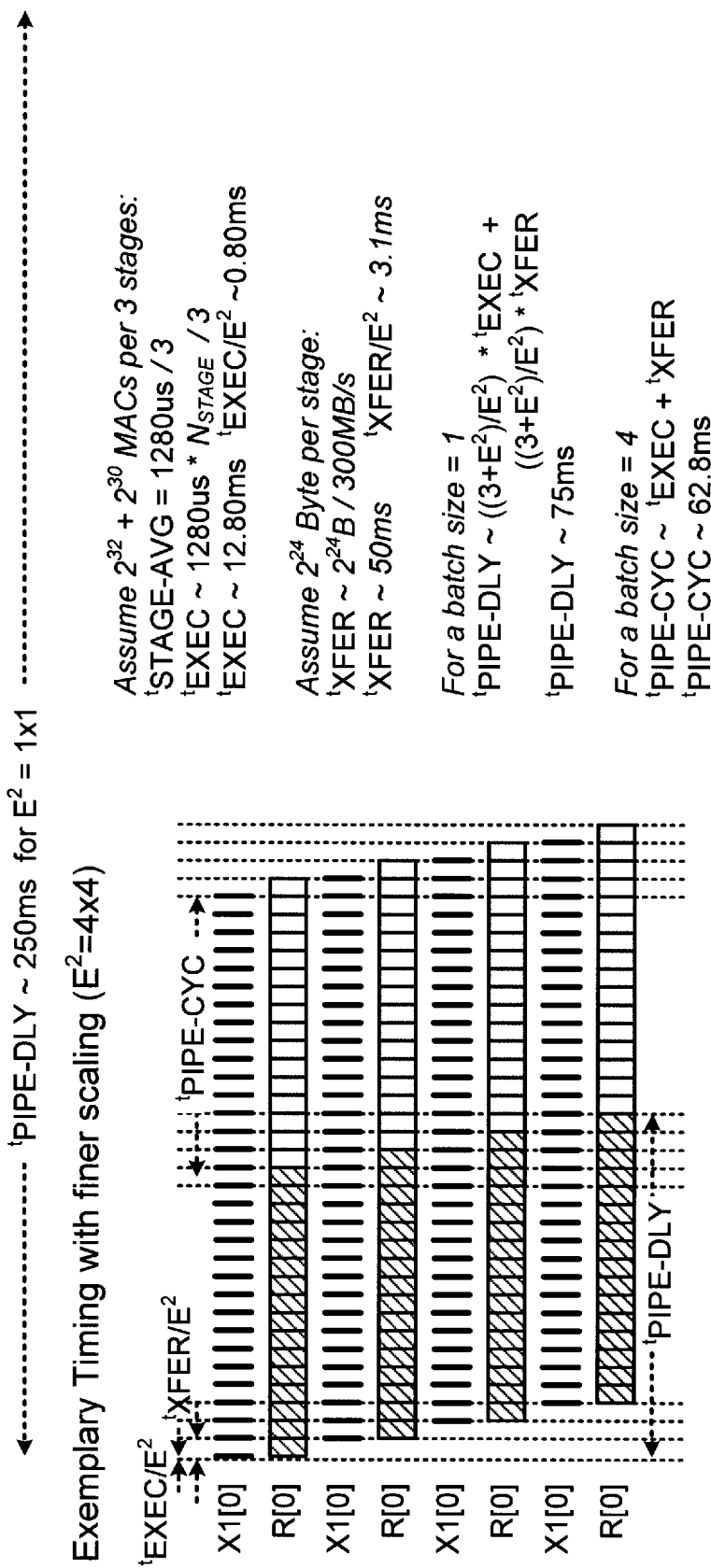
Figure 10:
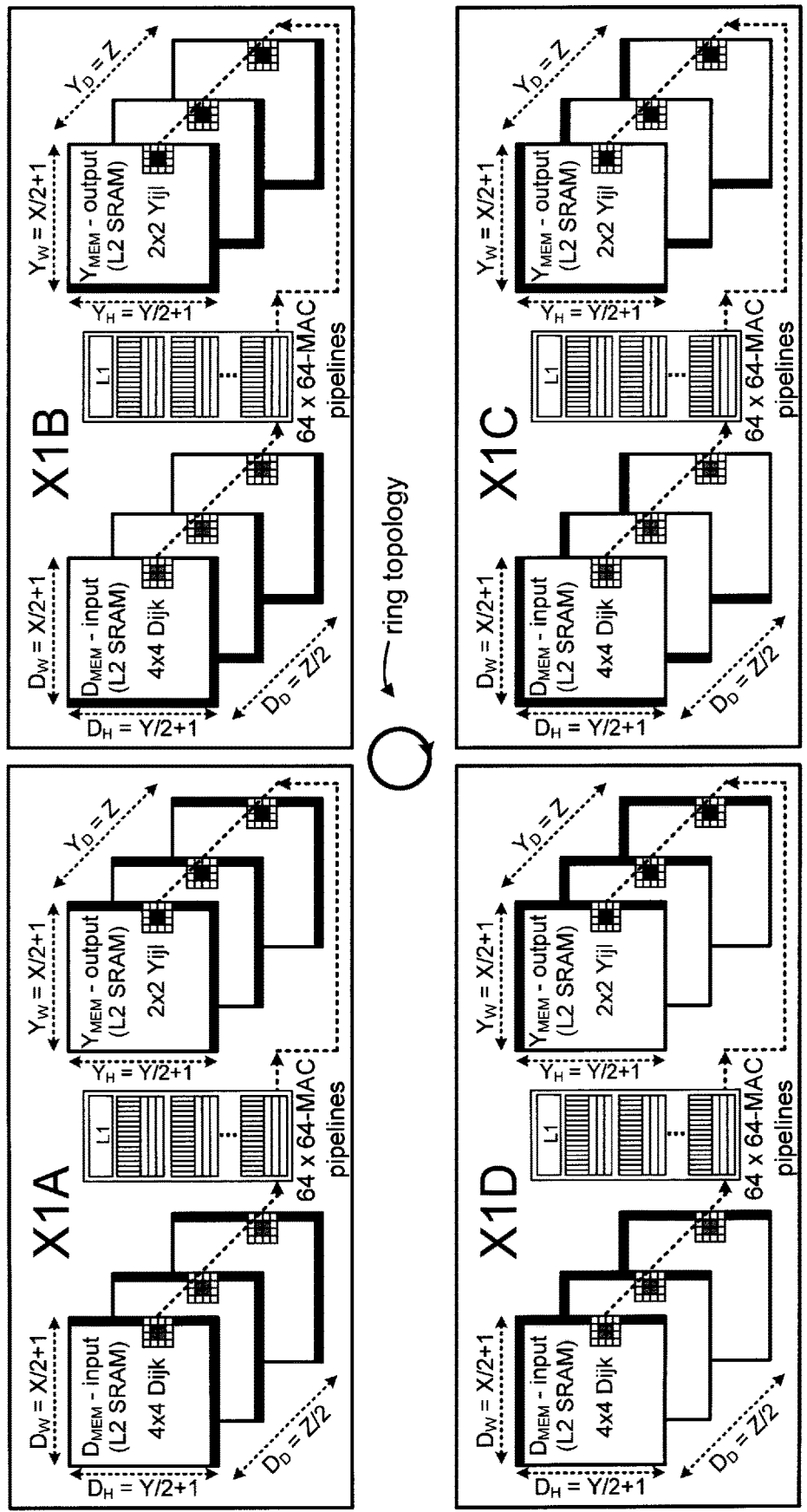
Figure 11A:
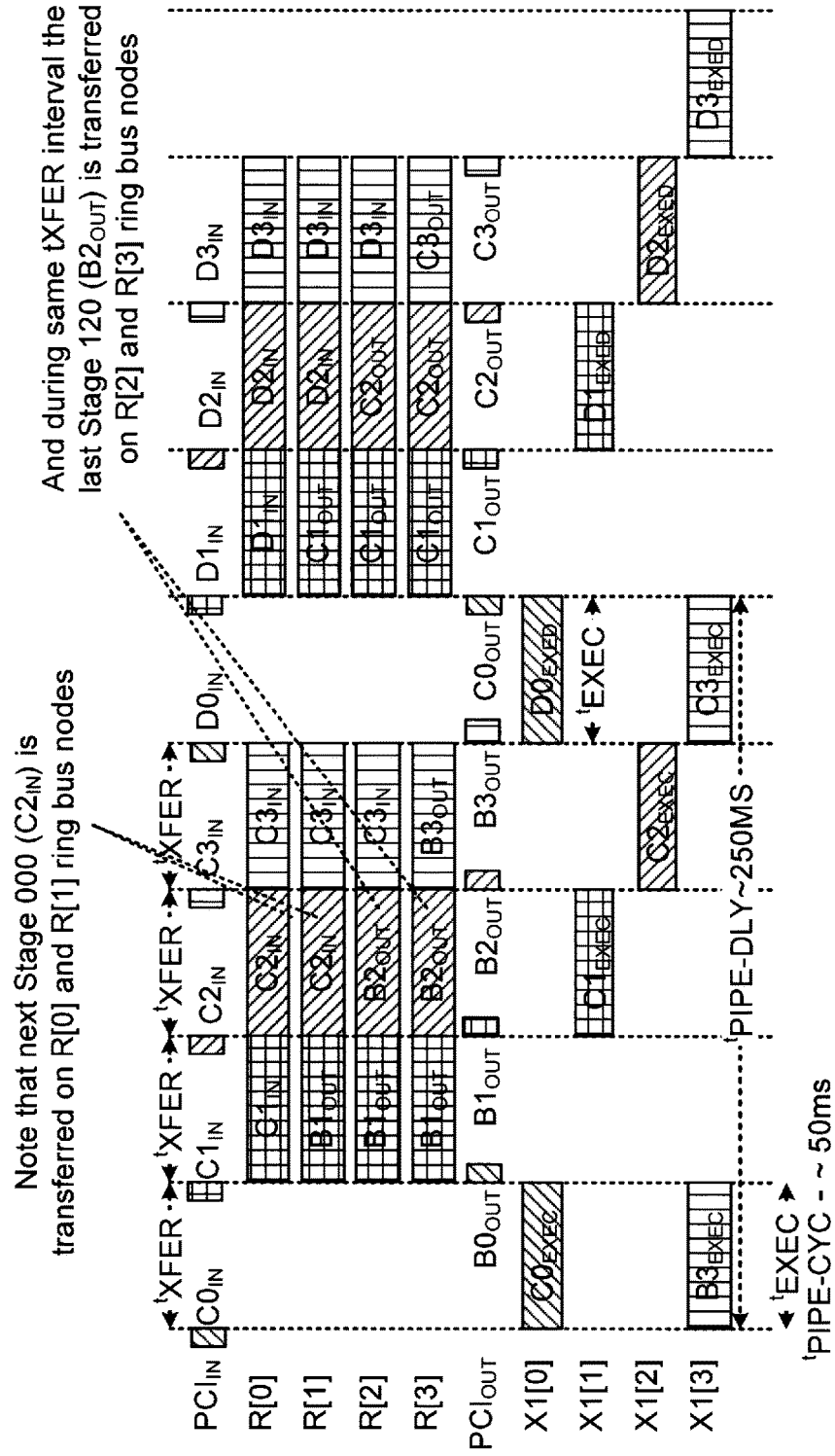
Figure 11B:
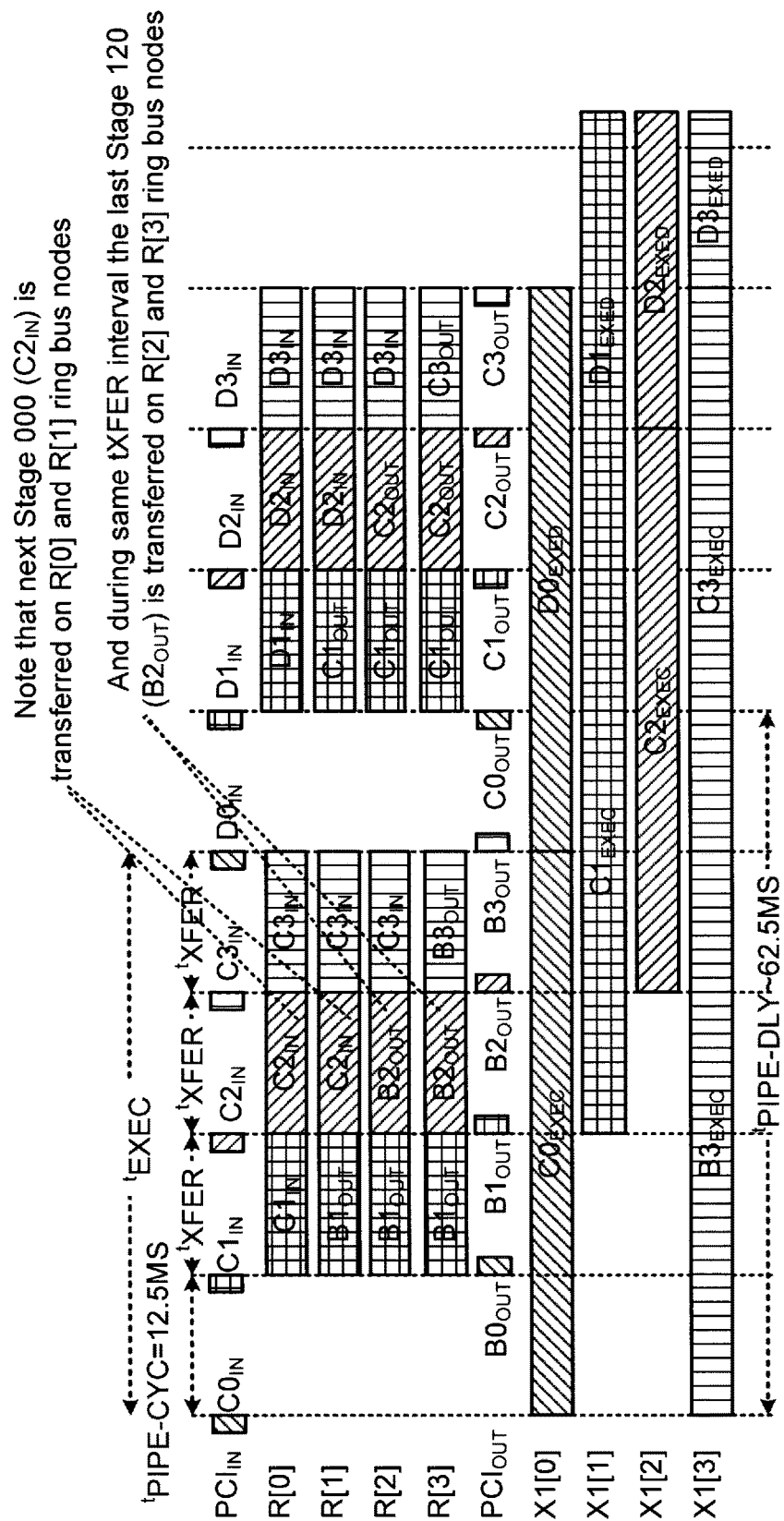
Figure 11C:
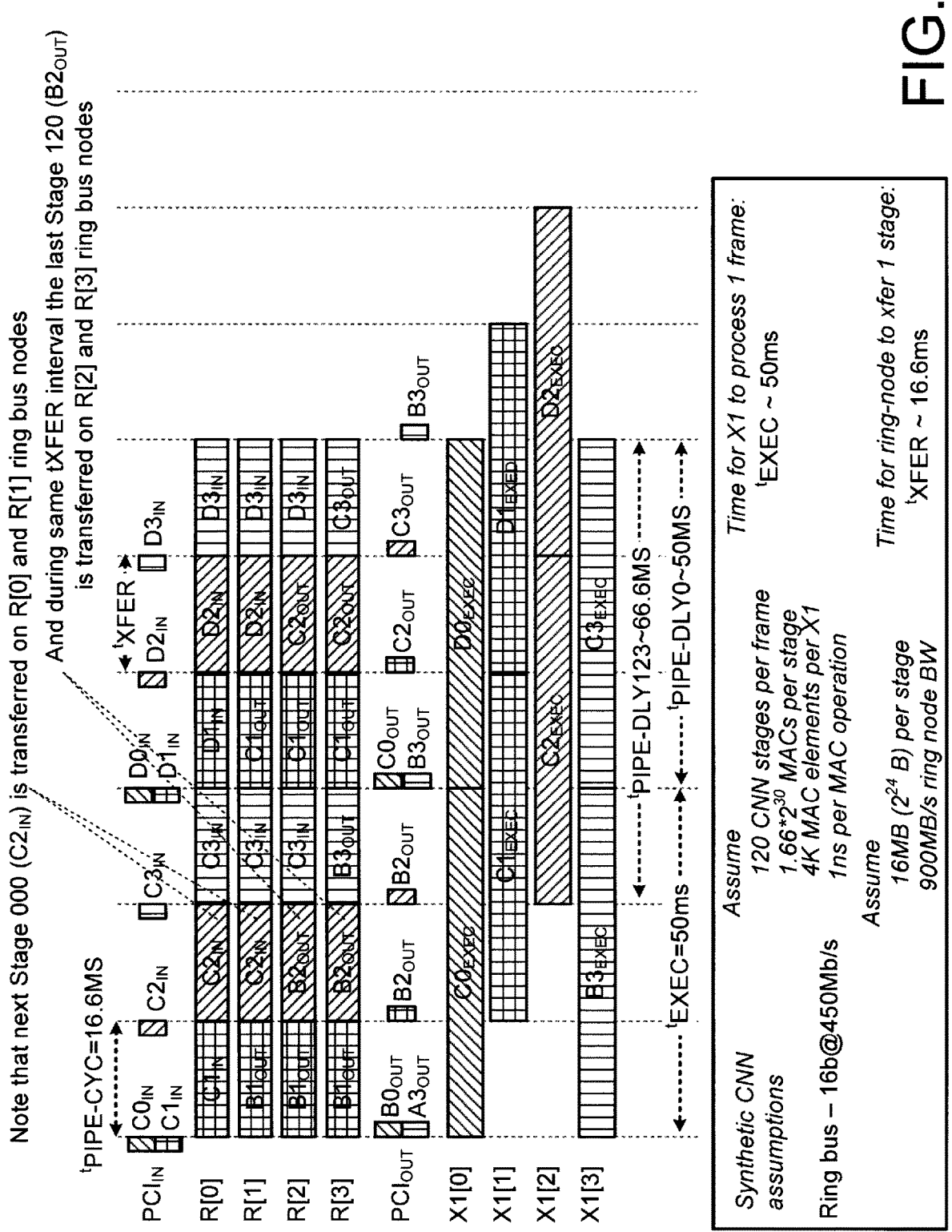
Figure 12A:
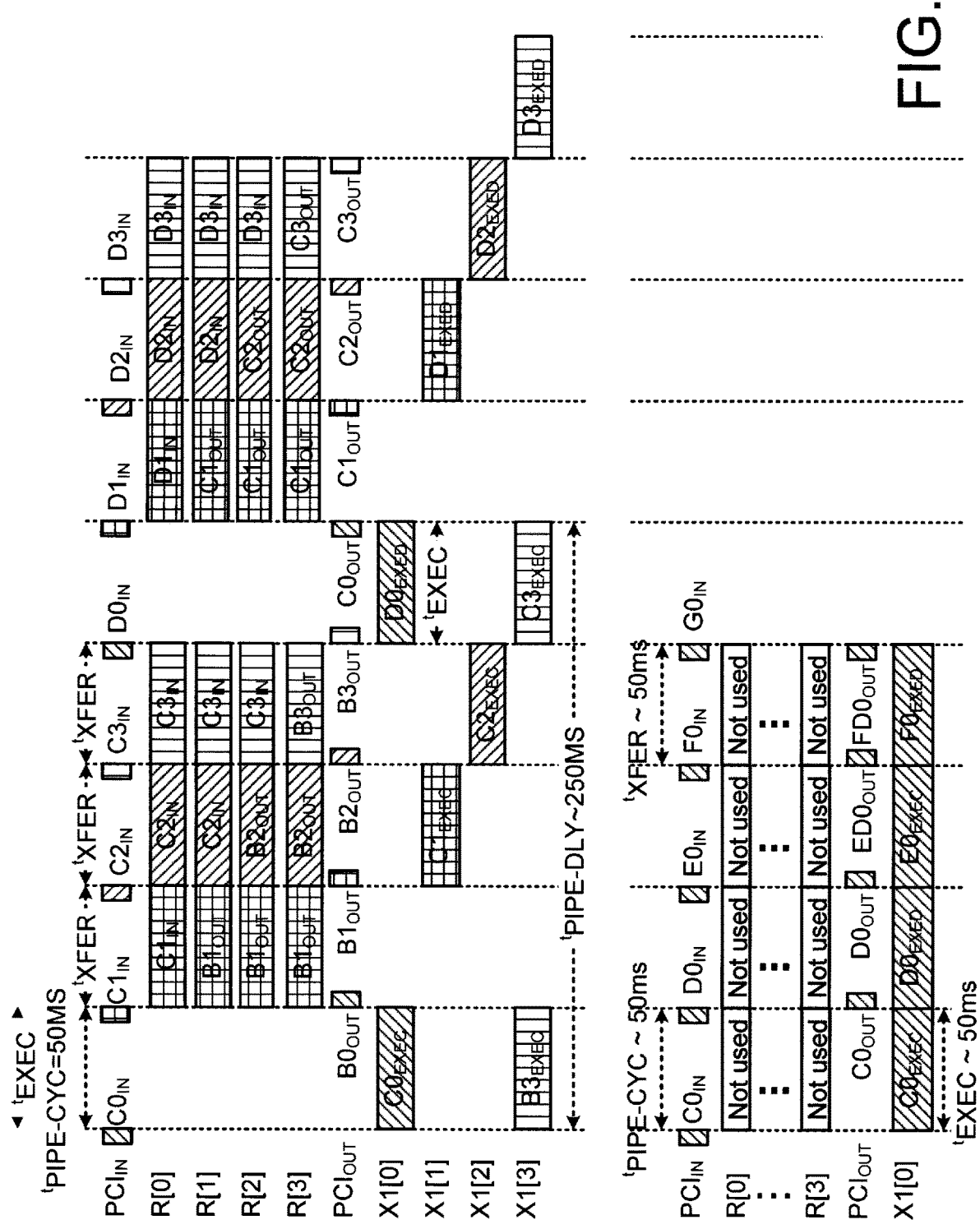
Figure 12B:
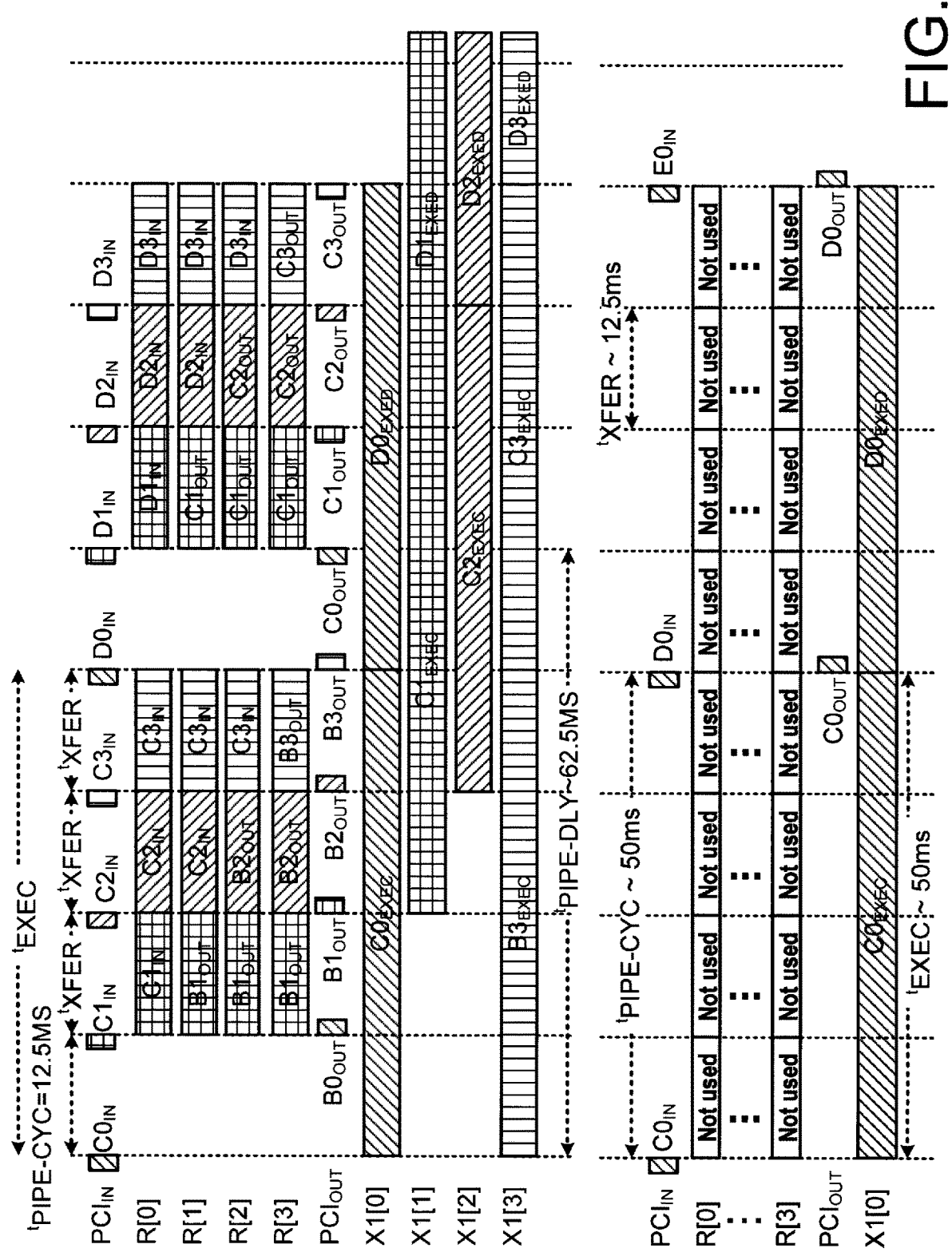

FIG. 1A is a schematic block diagram of a logical overview of an exemplary multiplier-accumulator execution pipeline, according to one or more aspects of the present inventions, wherein the multiplier-accumulator execution pipeline includes multiplier-accumulator circuitry ("MAC"), which is illustrated in block diagram form, operates concurrently; notably, the multiplier-accumulator circuitry includes one or more of the multiplier-accumulator circuits (although the individual multiplier-accumulator circuits are not specifically illustrated here); notably, in this exemplary embodiment, "r" (e.g., 64 in the illustrative embodiment) MAC processing elements in the execution pipeline operate concurrently whereby the processing elements perform r×r (e.g., 64×64) multiply-accumulate operations in each r (e.g., 64) cycle interval (here, a cycle may be nominally 1 ns); notably, each r (e.g., 64) cycle interval processes a DdNd (depth) column of input and output pixels/data at a particular (i,j) location (the indexes for the width Dw/Yw and height Dh/Yh dimensions of this exemplary embodiment—Dw=512, Dh=256, and Dd=128, and the Yw=512, Yh=256, and Yd=64) wherein the r (e.g., 64) cycle execution interval is repeated for each of the Dw*Dh depth columns for this stage; in addition, in one embodiment, the filter weights or weight data are loaded into memory (e.g., L1/L0 SRAM memories) before the stage processing started (see, e.g., the '306 and '345 applications);

FIG. 1B is an exemplary pseudo-code and operation count of the exemplary multiplier-accumulator execution pipeline embodiment illustrated in FIG. 1A, according to certain aspects of the present inventions;

FIG. 1C is a high-level block diagram of an integrated circuit or a portion of an integrated circuit (which may be referred to herein, at times, as an X1 component) including a plurality of multi-bit MAC execution pipelines having a plurality of multiplier-accumulator circuits each of which implement multiply and accumulate operations, according to certain aspects of the present inventions; the multi-bit MAC execution pipelines and/or the plurality of multiplier-accumulator circuits may be configured to implement one or more processing architectures or techniques (singly or in combination with one or more X1 components); in this illustrative embodiment, the multi-bit MAC execution pipelines are organized into clusters (in this illustrative embodiment, four clusters wherein each cluster includes a plurality of multi-bit MAC execution pipelines (in this illustrative embodiment each cluster includes 16, 64-MAC execution pipelines)); in one embodiment, the plurality of multiplier-accumulator circuitry are configurable or programmable (one-time or multiple times, e.g., at start-up and/or in situ) to implement one or more pipelining processing architectures or techniques (see, e.g., the expanded view of a portion of the high-level block diagram of FIG. 1C in the lower right is a single 64-MAC execution pipeline illustrated in FIG. 1A); the X1 component in this illustrative embodiment includes memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines; in one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers; in one embodiment, one or more (or all) of the clusters includes one or more computing elements (e.g., a plurality of multiplier-accumulator circuitry—labeled as "NMAX Rows"—see, e.g., the '306 and '345 applications); notably, in one embodiment, each MAC execution pipeline has dedicated L0 memory (e.g., SRAM memory), and a plurality (e.g., 16) MAC execution pipelines of a MAC cluster share L1 memory (e.g., SRAM memory); notably, the shift-in and shift-out paths of each 64-MAC execution pipeline is coupled to L2 memory (e.g., SRAM memory) wherein the L2 memory also couples to the L1 memory and L0 memory; the NOC couples the L2 memory to the PHY (physical interface) which may connect to L3 memory (e.g., external DRAM); the NOC also couples to a PCIe or PHY which, in turn, may provide interconnection to or communication with circuitry external to the X1 component (e.g., an external processor, such as a host processor); the NOC, in one embodiment, may also connect a plurality of X1 components (e.g., via GPIO input/output PHYs) which allow multiple X1 components to process related data (e.g., image data) concurrently, as discussed herein, in accordance with one or more aspects of the present inventions;

FIG. 2A illustrates a schematic block diagram of an exemplary embodiment of multiplier-accumulator circuitry of a plurality of multiplier-accumulator execution pipelines configured in and implementing a concurrent processing techniques, according to certain aspects of the present inventions; notably, in one embodiment, the multiplier-accumulator execution pipelines (in this illustrative embodiment, two pipelines—each pipeline including 64 multiplier-accumulator circuits) are configured to implement a concurrent processing technique may be located in the same cluster of a X1 component (e.g., Cluster A of the X1 component illustrated in FIG. 1C) or, in another embodiment, in different clusters of a X1 component (e.g., Clusters A and B of the X1 component illustrated in FIG. 1C);

FIG. 2B illustrates a schematic block diagram of an exemplary embodiment of multiplier-accumulator circuitry of a plurality of multiplier-accumulator execution pipelines configured in and implementing a concurrent processing techniques, according to certain aspects of the present inventions; notably, in this embodiment, the multiplier-accumulator execution pipelines (in this illustrative embodiment, two pipelines—each pipeline including 64 multiplier-accumulator circuits) are configured in a serial architecture to implement a larger pipeline (in the illustrative embodiment, 2×MAC execution pipeline—here, 128-MAC pipeline having 128 multiplier-accumulator circuits); notably, the serial architecture may be increased or decreased to provide a multiplier-accumulator execution pipeline of a predetermined, desired and/or exact size or "length" (e.g., 2≤size of multiplier-accumulator execution pipeline ≤256); the size or length of the multiplier-accumulator execution pipeline may be configurable or programmable (e.g., one-time or multiple times—such as, in situ (i.e., during operation of the integrated circuit) and/or at or during power-up, start-up, initialization, re-initialization, configuration, re-configuration or the like);

FIG. 3 illustrates a schematic block diagram of an exemplary embodiment of a plurality of MAC execution pipelines, configured to process a plurality of stages (e.g., stage [i] and stage [i+1]) of an image plane/frame or planes/frames wherein the execution pipelines process the image data of these stages concurrently (i.e., there is temporal overlap of processing of related data by a plurality of MAC execution pipelines), according to certain aspects of the present inventions; notably, in one embodiment the of MAC execution pipelines are located in the same cluster of pipelines; in another embodiment, the of MAC execution pipelines are located in different clusters of the same X1 component;

FIG. 4A illustrates a schematic block diagram of a logical overview of an exemplary embodiment of multiplier-accumulator circuitry of a multiplier-accumulator execution pipeline implementing a filtering data processing technique of the input images/data, according to certain aspects of the present inventions; the configuration and processing technique illustrated in FIG. 4A may be implemented in any of the concurrent processing techniques and/or configurations/architectures implementing such techniques that are described and/or illustrated herein—including, for example, the embodiments illustrated in FIGS. 2A, 2B and 3;

FIG. 4B illustrates an exemplary pseudo-code and operation count of the exemplary multiplier-accumulator execution pipeline embodiment illustrated in FIG. 4A, according to certain aspects of the present inventions;

FIG. 5 illustrates a schematic block diagram of a physical overview of an exemplary embodiment of a plurality of multiplier-accumulator execution pipelines, each pipeline including the multiplier-accumulator circuitry (illustrated in block diagram form), wherein the plurality of multiplier-accumulator execution pipelines are configured to implement a Winograd technique of data processing in a concurrent processing configuration/architecture, according to certain aspects of the present inventions; notably, in this example, the 64×(4×4) input pixels/data at dij, which determine the associated 64×(2×2) output pixels at yij, are processed by a plurality (here, 16) of multiplier-accumulator execution pipelines in connection with concurrent operation of multiple execution pipelines of multiple X1 components; see the discussion of the Winograd processing techniques in U.S. patent application Ser. No. 16/796,111 and U.S. Provisional Patent Application No. 62/823,161, filed Feb. 20, 2020 and Mar. 25, 2019, respectively); as noted above, the '111 and '161 applications are hereby incorporated herein by reference in their entirety;

FIG. 6A illustrates a high-level block diagram of a plurality of X1 components (e.g., the X1 component illustrated in FIG. 1C) disposed on one integrated circuit die, a portion of an integrated circuit die, and/or a printed circuit board or other substrate, according to one or more aspects of the present inventions; here, the plurality of X1 components may be controllable or programmable (e.g., in situ or at start-up/power-up); moreover, the interconnection (e.g., point-to-point or bus such as multi-drop, ring, star, etc.) between the circuitry of the X1 components (e.g., one or more multiplier-accumulator execution pipelines of each X1 component) and/or the operation(s) thereof may be controllable or programmable to, for example, implement coordinated data processing operations, according to one or more aspects of the present inventions; the circuitry of each of the X1 components (e.g., the circuitry of the MAC execution pipelines) may be configurable or programmable (e.g., one-time or multiple times—such as, in situ (i.e., during operation of the integrated circuit) and/or at or during power-up, start-up, initialization, re-initialization, configuration, re-configuration or the like); notably, the X1 components may or may not be identical in structure, circuitry, architecture and/or configuration; each X1 component, however, includes a plurality of multi-bit MAC execution pipelines having a plurality of multiplier-accumulator circuits each of which implement multiply and accumulate operations; indeed, the plurality of MAC execution pipelines (each having a plurality of multiplier-accumulator circuits) may be configured to implement concurrent processing as illustrated in the exemplary embodiments of FIGS. 1A, 2A, 2B, 3, 4A and 5;

FIG. 6B illustrates a high-level block diagram of an integrated circuit including four X1 components (e.g., the X1 component illustrated in FIG. 1C) that may be controllably interconnected (e.g., in situ or at start-up/power-up), according to one or more aspects of the present inventions and/or to implement one or more aspects of the present inventions; notably, although FIG. 6B illustrates four components, these aspects of present inventions are not limited thereto—rather any number of a plurality of components may be controllably interconnected (e.g., the components may be interconnected via a bus interface (e.g., GPIO interface)) and/or the operation(s) thereof controllably coordinated to implement aspects of the present inventions; moreover, the X1 components may or may not be identical in structure, circuitry, architecture and/or configuration; each X1 component, however, includes a plurality of multi-bit MAC execution pipelines having a plurality of multiplier-accumulator circuits each of which implement multiply and accumulate operations and may be configured according to or may implement any of the aspects of the present inventions—including, for example, configurations that implement concurrent processing such as those set forth in the exemplary embodiments of FIGS. 1A, 2A, 2B, 3, 4A and 5;

FIG. 6C illustrates a high-level block diagram of a printed circuit board (PCB) or other substrate including four X1 components (e.g., the X1 component illustrated in FIG. 1C) that may be controllably interconnected (e.g., in situ or at start-up/power-up) to implement aspects of the present inventions; notably, although FIG. 6C illustrates four components, these aspects of present inventions are not limited thereto—rather any number of a plurality of components may be controllably interconnected (e.g., the components may be interconnected via a bus interface (e.g., GPIO interface)) and/or the operation(s) thereof controllably coordinated to implement aspects of the present inventions; moreover, the X1 components may or may not be identical in structure, circuitry, architecture and/or configuration; each X1 component, however, includes a plurality of multi-bit MAC execution pipelines having a plurality of multiplier-accumulator circuits each of which implement multiply and accumulate operations and may be configured according to any of the aspects of the present inventions;

FIG. 7A illustrates a high-level block diagram of a plurality of X1 components (in this illustrative exemplary embodiment, 4) wherein the X1 components (e.g., the X1 component illustrated in FIG. 1C) is controllably configured/interconnected (e.g., in situ or at start-up/power-up) in a ring topology or architecture to implement certain aspects of the present inventions; here, each of the X1 components is connected to external memory (L3 memory, e.g., DRAM) via interface circuitry and an interface bus; notably, the plurality of components may be configured/interconnected in topologies or architectures other than a ring—all such topologies/architectures are intended to fall within the scope of the present inventions; moreover, the X1 components may or may not be identical in structure, circuitry, architecture and/or configuration; each X1 component, however, includes a plurality of multi-bit MAC execution pipelines having a plurality of multiplier-accumulator circuits each of which implement multiply and accumulate operations and may be configured according to any of the aspects of the present inventions including, for example, configurations that implement concurrent processing such as those set forth in the exemplary embodiments of FIGS. 1A, 2A, 2B, 3, 4A and 5;

FIG. 7B illustrate a schematic block diagram of a logical overview of an exemplary multiplier-accumulator execution pipeline, according to one or more aspects of the present inventions, wherein the multiplier-accumulator execution pipeline includes a plurality of multiplier-accumulator circuitry, which is illustrated in block diagram form, to process data (e.g., image data of a stage of a frame); notably, the multiplier-accumulator circuitry includes one or more of the multiplier-accumulator circuits (although the individual multiplier-accumulator circuits are not specifically illustrated here), for example, a multiplier-accumulator circuit as described and/or illustrated in the exemplary embodiments of FIGS. 1A-1C of the '306 and '345 applications, and the text associated therewith; notably, however, multiplier-accumulator circuits is not limited to the particular circuit, logical, block, functional and/or physical diagrams, block/data width, data path width, bandwidths, and processes illustrated and/or described in accordance with, for example, the exemplary embodiment of FIGS. 1A-1C of the '306 and '345 applications;

FIGS. 7C to 7E illustrate block diagram representations of a plurality of image frames, each image frame including a plurality of stages, wherein each stage includes a plurality of related image data which is processed, concurrently, via a plurality of X1 components (in this example, four X1 components—see, e.g., FIGS. 6B, 6C and 7A), according to one or more aspects of the present inventions; in one embodiment, the plurality of multiplier-accumulator execution pipelines of the plurality of X1 components are configured to process the related image data using a configuration or architecture like that of the exemplary embodiment illustrated in FIG. 7B and the plurality of X1 components are interconnected via a ring bus (see, e.g., FIG. 7A); notably, however, the plurality of MAC execution pipelines (each having a plurality of multiplier-accumulator circuits) may be configured to perform multiply and accumulate operations according to any of the aspects of the present inventions including, for example, the processing configurations such as those set forth in the exemplary embodiments of FIGS. 1A, 2A, 2B, 3, 4A, 5 and/or 7B; moreover, architectures other than a ring bus may be employed to interconnect the X1 components including, for example, star, multidrop or point-to-point;

FIG. 8A illustrates an exemplary timing diagram (wherein temporal decomposition example having coarse scaling ($E^2=1\times1$)) of the embodiment of processing the image pixels/data of FIG. 7C, according to one or more aspects of the present inventions; in this exemplary implementation/configuration, each X1 component (having a plurality of clusters and each cluster includes a plurality of MAC execution pipelines) processes data of a subset of the stages of a frame before communicating, writing and/or sending (via, e.g., a ring bus) the final output stage to a subsequent/next X1 component for further processing;

FIGS. 8B and 8C illustrate exemplary temporal decompositions having different scaling (i.e., a first scaling ($E^2=2\times2$) of FIG. 8B and a second, more finer scaling ($E^2=4\times4$) of FIG. 8C) in connection with the data processing of image pixels/data of the embodiment illustrated in the FIG. 7D, according to one or more aspects of the present inventions; notably, the plurality of configurable multiplier-accumulator execution pipelines of the plurality of X1 components are configured to process the related image data using a configuration or architecture like that of the exemplary embodiment illustrated in FIG. 7B; moreover, the plurality of X1 components, in one embodiment, are controllably configured/interconnected (e.g., in situ or at start-up/power-up) in a ring bus topology or architecture as illustrated in the exemplary embodiment of FIG. 7A;

FIGS. 9A and 9B illustrate exemplary data flow of the data processing of image pixels/data of the embodiment illustrated in the FIG. 7D implementing different scaling, according to one or more aspects of the present inventions, including a first scaling (fine scaling ($E^2=2\times2$)) of FIG. 9A and a second, more finer scaling ($E^2=4\times4$) of FIG. 9B;

FIG. 10 illustrates exemplary data transfer or transport flow between the X1 components in connection with an embodiment implementing 3×3 filtering (e.g., FIG. 4A) or implementing Winograd processing technique (e.g., FIG. 5), according to one or more aspects of the present inventions; notably, in each quadrant in each X1 component, one horizontal edge and one vertical edge of input image pixels/data is exchanged with the adjacent X1 component wherein, in one embodiment, this exchange operation may proceed or be implemented in parallel with processing of the interior pixels/data, but this transport delay is completed within the execution time of each quadrant;

FIG. 11A illustrates an exemplary timing diagram of an embodiment of processing wherein each X1 component processes all of the stages of different frames (e.g., FIG. 7E), according to one or more aspects of the present inventions; here, the MAC execution/processing pipelines of each component processes all the image pixels of all of the stages in a given frame; notably, the first stage may be input or provided into the associated X1 component (via, for example, an external processor) before the processing of the first stage starts, and the last stage (in this illustrative embodiment, 120th stage) would be communicated, moved or output back to external circuitry (e.g., an external processor or memory) from each of the X1 components;

FIG. 11B illustrates another exemplary timing diagram of the embodiment of processing wherein each X1 component processes all of the stages of a frame wherein the data of each stage of each frame is processed by a different X1 component (e.g., FIG. 7E), according to one or more aspects of the present inventions, wherein the transfer rate (in this illustrative embodiment, 12.5 ms) is faster than the transfer rate of the embodiment of FIG. 11A (in that embodiment, 50 ms); here, the MAC execution/processing pipelines of each component processes all the image pixels of all of the stages in a given frame; notably, the first stage may be input or provided into the associated X1 component (via, for example, an external processor) before the processing of the first stage starts, and the last stage (in this illustrative embodiment, 120th stage) would be communicated, moved or output back to external circuitry (e.g., an external processor or memory) from each of the X1 components;

FIG. 11C illustrates yet another exemplary timing diagram of the embodiment of processing wherein each X1 component processes all of the stages of a frame wherein the data of each stage of each frame is processed by a different X1 component (e.g., FIG. 7E), according to one or more aspects of the present inventions, wherein the transfer rate (in this illustrative embodiment, 16.6 ms) is faster than the transfer rate of the embodiment of FIG. 11A (in that embodiment, 50 ms) but slower than the transfer rate of the embodiment of FIG. 11B (12.5 ms); here, the MAC execution/processing pipelines of each component processes all the image pixels of all of the stages in a given frame; notably, the first stage may be input or provided into the associated X1 component (via, for example, an external processor) before the processing of the first stage starts, and the last stage (in this illustrative embodiment, 120th stage) would be communicated, moved or output back to external circuitry (e.g., an external processor or memory) from each of the X1 components;

FIGS. 12A and 12B illustrate exemplary timing diagrams of the embodiment of processing wherein each X1 component processes all of the stages of a frame wherein the data of each stage of each frame is processed by a different X1 component (e.g., FIG. 7E) having a transfer rate (50 ms) and transfer rate (12.5 ms), respectively, according to one or more aspects of the present inventions; and FIGS. 13A to 13E illustrate, in schematic block diagram form, exemplary embodiments of integrating one or more X1 components into a data processing system, according to one or more aspects of the present inventions; wherein "packaging" or "integration" alternatives, include, for example, (i) fabricating a plurality of X1 components on one or more dice (e.g., FIGS. 13A, 13B and 13C), (ii) disposing, fixing or placing a plurality of X1 components on a PCB (e.g., FIG. 13D), and/or (iii) die-stacking a plurality of X1 components (e.g., FIG. 13E); notably, all X1 component packaging and integration architectures, including X1 component communication techniques and/or interconnection architectures (e.g., ring, star or multi-drop bus implementations and/or configurations), are intended to fall within the scope of the present inventions.

As stated above, the pseudo-code, operations, configurations, block/data width, data path width, bandwidths, data lengths, values, processes and/or algorithms described and/or illustrated in the FIGURES are exemplary and the inventions hereof are not limited to any particular or exemplary circuit, logical, block, functional and/or physical diagrams, number of multiplier-accumulator circuits employed in an execution pipeline, number of execution pipelines employed in a particular processing configuration/architecture, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams. Moreover, as noted above, although the illustrative/exemplary embodiments include a plurality of memories (e.g., L3 memory, L2 memory, L1 memory, L0 memory) which are assigned, allocated and/or used to store certain data and/or in certain organizations, one or more of memories may be added, and/or one or more memories may be omitted and/or combined/consolidated—for example, the L3 memory or L2 memory, and/or the organizations may be changed.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed or illustrated separately herein.

DETAILED DESCRIPTION

In one aspect, the present inventions are directed to one or more integrated circuits having multiplier-accumulator circuitry (and methods of operating such circuitry) including a plurality of multiplier-accumulator execution pipelines that process related data (e.g., image data) concurrently. In one embodiment, each of the execution pipelines includes a plurality of multiplier-accumulator circuits to perform or implement multiply and accumulate operations in connection with the related data. Here, a plurality of separate multiplier-accumulator execution pipelines, each including a plurality of multiplier-accumulator circuits, concurrently process related data (e.g., image data). In one embodiment, the plurality of multiplier-accumulator execution pipelines includes a plurality of registers (including a plurality of shadow registers) that facilitate pipelining of the multiply and accumulate operations to increase throughput of the multiplier-accumulator execution or processing pipelines in connection with processing the related data (e.g., image data such as, e.g., one or more stages of one or more image frames).

In one embodiment, the integrated circuit(s) include a plurality of clusters (e.g., two, four or eight) wherein each cluster includes a plurality of multiplier-accumulator circuit ("MAC") execution pipelines (e.g., 16). Each MAC execution pipeline may include a plurality of separate multiplier-accumulator circuits (e.g., 64) to implement multiply and accumulate operations. In one embodiment, a plurality of clusters are interconnected to form a processing component (such component is often identified in the figures as "X1" or "X1 component") that may include memory (e.g., SRAM, MRAM and/or Flash), a switch interconnect network to interconnect circuitry of the component (e.g., the multiplier-accumulator circuits and/or MAC execution pipeline(s) of the X1 component) and/or circuitry of the component with circuitry of one or more other X1 components. Here, the multiplier-accumulator circuits of the one or more MAC execution pipelines of a plurality of clusters of a X1 component may be configured to concurrently process related data (e.g., image data). That is, the plurality of separate multiplier-accumulator circuits of a plurality of MAC execution pipelines may concurrently process related data to, for example, increase the data throughput of the X1 component.

Notably, the X1 component may also include interface circuitry (e.g., PHY and/or GPIO circuitry) to interface with, for example, external memory (e.g., DRAM, MRAM, SRAM and/or Flash memory).

In one embodiment, the MAC execution pipeline may be any size or length (e.g., 16, 32, 64, 96 or 128 multiplier-accumulator circuits). Indeed, the size or length of the pipeline may be configurable or programmable (e.g., one-time or multiple times—such as, in situ (i.e., during operation of the integrated circuit) and/or at or during power-up, start-up, initialization, re-initialization, configuration, re-configuration or the like).

In another embodiment, the one or more integrated circuits include a plurality of components or X1 components (e.g., 2, 4, . . . ), wherein each component includes a plurality of the clusters having a plurality of MAC execution pipelines. For example, in one embodiment, one integrated circuit includes a plurality of components or X1 components (e.g., 4 clusters) wherein each cluster includes a plurality of execution or processing pipelines (e.g., 16, 32 or 64) which may be configured or programmed to process, function and/or operate concurrently to process related data (e.g., image data) concurrently. In this way, the related data is processed by each of the execution pipelines of a plurality of the clusters concurrently to, for example, decrease the processing time of the related data and/or increase data throughput of the X1 components.

In one embodiment, a plurality of execution or processing pipelines of each of the clusters of a plurality of the X1 components may be interconnected, for example, in a ring configuration or architecture to concurrently process related data (e.g., image data). Here, a plurality of MAC execution pipelines of one or more (or all) of the clusters of a plurality of X1 components (which may be integrated/manufactured on a single die or multiple dice) may be interconnected in a ring configuration or architecture (wherein a bus interconnects the components) to concurrently process related data. For example, a plurality of MAC execution pipelines of one or more (or all) of the clusters of each X1 component are configured to process one or more stages of an image frame such that circuitry of each X1 component processes one or more stages of each image frame of a plurality of image frames. In another embodiment, a plurality of MAC execution pipelines of one or more (or all) of the clusters of each X1 component are configured to process one or more portions of each stage of each image frame such that circuitry of each X1 component is configured to process a portion of each stage of each image frame of a plurality of image frames. In yet another embodiment, a plurality of MAC execution pipelines of one or more (or all) of the clusters of each X1 component are configured to process all of the stages of at least one entire image frame such that circuitry of each X1 component is configured to process all of the stage of at least one image frame. Here, each X1 component is configured to process all of the stages of one or more image frames such that the circuitry of each X1 component processes a different image frame.

With reference to FIG. 1A, in one embodiment of the present inventions, the multiplier-accumulator circuitry in the execution pipeline operates concurrently. In this exemplary embodiment, "r" (e.g., 64 in the illustrative embodiment) MAC processing circuits in the execution pipeline operate concurrently whereby the multiplier-accumulator processing circuits perform r×r (e.g., 64×64) multiply-accumulate operations in each r (e.g., 64) cycle interval (here, a cycle may be nominally 1 ns). Thereafter, next input pixels/data (e.g., 64) are shifted-in and the previous output pixels/data are shifted-out during the same r (e.g., 64) cycle interval. Notably, each r (e.g., 64) cycle interval processes a Dd/Yd (depth) column of input and output pixels/data at a particular (i,j) location (the indexes for the width Dw/Yw and height Dh/Yh dimensions). The r (e.g., 64) cycle execution interval is repeated for each of the Dw*Dh depth columns for this stage. In this exemplary embodiment, the filter weights or weight data are loaded into memory (e.g., the L1/L0 SRAM memories) from, for example, an external memory or processor before the stage processing started (see, e.g., the '306 provisional application). In this particular exemplary embodiment, the input stage has Dw=512, Dh=256, and Dd=128, and the output stage has Yw=512, Yh=256, and Yd=64. Note that only 64 of the 128 Dd input planes are processed in each 64×64 MAC execution operation.

With continued reference to FIG. 1A, the method implemented by the configuration illustrated may accommodate arbitrary image/data plane dimensions (Dw/Yw and Dh/Yh) by simply adjusting the number of iterations of the basic 64×64 MAC accumulation operation that are performed. The loop indices "I" and "j" are adjusted by control and sequencing logic circuitry to implement the dimensions of the image/data plane. Moreover, the method may also be adjusted and/or extended to handle a Yd column depth larger than the number of MAC processing elements (e.g., 64 in this illustrative example) in the execution pipeline. In one embodiment, this may be implemented by dividing the depth column of output pixels into blocks of 64, and repeating the 64×64 MAC accumulation of FIG. 1A for each of these blocks.

Indeed, the method illustrated in FIG. 1A may be further extended to handle a Dd column depth larger than the number of MAC processing elements (64 in this illustrative example) in the execution pipeline. This may be implemented, in one embodiment, by initially performing a partial accumulation of a first block of 64 data of the input pixels Dijk into each output pixel Yijl'. Thereafter, the partial accumulation values Yijl' are read (from the memory $Y_{mem}$) back into the execution pipeline as initial values for a continuing accumulation of the next block of 64 input pixels Dijk into each output pixel Yijl. The memory which stores or holds the continuing accumulation values (e.g., L2 memory) may be organized, partitioned and/or sized to accommodate any extra read/write bandwidth to support the processing operation.

The pseudo-code illustrated in FIG. 1B illustrates the looping performed by the control and sequencing logic associated with the MAC execution pipeline. This looping shows the accumulation of the products of Dijk input pixels and Fkl filter values into partial sums Yijl. In this embodiment, the partial sums Yijl are then accumulated into the final output pixel values Yijl. The output pixel values/data may thereafter be stored in memory (e.g., L2 memory) and/or provided to external circuitry for processing and/or analysis.

Notably, the circuitry and techniques, which generalize the applicability of the 64×64 MAC execution pipeline, may also be utilized or extend the generality of the additional processing methods or techniques that will be implemented or described in later sections of this application.

With reference to FIG. 1C, the integrated circuit may include a plurality of multi-bit MAC execution pipelines which are organized as one or more clusters of a processing component. Here, the component may include "resources" such as a bus interfaces (e.g., a PHY and/or GPIO) to facilitate communication with circuitry external to the component and memory (e.g., SRAM and DRAM) for storage and use by the circuitry of the component. For example, with reference to FIG. 1C, in one embodiment, four clusters are included in the component (labeled "X1") wherein each cluster includes a plurality of multi-bit MAC execution pipelines (in this illustrative embodiment 16 64-MAC execution pipelines). Notably, a single 64-MAC execution pipeline of FIG. 1A is illustrated at the lower right for reference purposes.

With continued reference to FIG. 1C, the memory hierarchy in this exemplary embodiment includes an L0 memory (e.g., SRAM) that stored filter weights or coefficients to be employed by multiplier-accumulator circuits in connection with the multiplication operations implemented thereby. In one embodiment, each MAC execution pipeline includes an L0 memory to store the filter weights or coefficients associated with the data under processing by the circuitry of the MAC execution pipeline. An L1 memory (a larger SRAM resource) is associated with each cluster of MAC execution pipelines. These two memories may store, retain and/or hold the filter weight values Fijklm employed in the accumulation operations.

Notably, the embodiment of FIG. 1C may employ an L2 memory (e.g., an SRAM memory that is larger than the SRAM of L1 or L0 memory). In addition, the X1 component may connect to an external memory (e.g., an even larger external L3 DRAM) that may be shared by one or more (or all) of the clusters of MAC execution pipelines. These memories store or hold the input image pixels Dijk and the output image pixels Yijl, as well as filter weight values Fijklm. Although the illustrative or exemplary embodiments described and/or illustrated a plurality of different memories (e.g., L3 memory, L2 memory, L1 memory, L0 memory) which are assigned, allocated and/or used to store certain data and/or in certain organizations, one or more of other memories may be added, and/or one or more memories may be omitted and/or combined/consolidated—for example, the L3 memory or L2 memory, and/or the organizations may be changed. All combinations are intended to fall within the scope of the present inventions.

Notably, in the illustrative embodiments set forth herein (text and drawings), the multiplier-accumulator circuitry and/or multiplier-accumulator pipeline is, at times, labeled "NMAX", "NMAX pipeline", "MAC", or "MAC pipeline".

With reference to FIG. 2A, in one embodiment, a plurality of multiplier-accumulator execution pipelines concurrently processes related data (e.g., image data). Here, each of the execution pipelines includes a plurality of multiplier-accumulator circuits to perform or implement multiply and accumulate operations in connection with the related data. The processing (e.g., multiply and accumulate operations) of the related data by the circuits of a plurality of separate multiplier-accumulator execution pipelines is temporally concurrent. In one embodiment, the plurality of multiplier-accumulator execution pipelines includes a plurality of registers (not illustrated) that facilitate pipelining of the multiply and accumulate operations to increase throughput of the multiplier-accumulator execution or processing pipelines in connection with processing the related data.

With continued reference to FIG. 2A, in one exemplary embodiment, two or more MAC execution pipelines concurrently process the related data. Here, the multiply and accumulate operations by the multiplier-accumulator circuits of the execution pipelines are performed or implemented in parallel. In this particular embodiment, the stage may utilize additional 64-MAC execution pipelines in parallel to operate concurrently on other pixels/data (i',j') of the input frame or data layers. This may utilize additional L2 memory ports (e.g., by dividing, segmenting or splitting the L2 memory across multiple physical SRAM blocks). Here, the concurrent MAC execution pipeline operation duplicates the weight data (labeled as Fkl) across the memory (e.g., L0 memory) so that the multiplier-accumulator circuits of each MAC execution pipeline may operate in parallel or concurrently. Notably, in the exemplary embodiment illustrated in FIG. 2A, the input stage has Dw=512, Dh=256, and Dd=128, and the output stage has Yw=512, Yh=256, and Yd=64.

The MAC execution pipelines (and circuitry thereof) of the embodiment illustrated in FIG. 2A may be located (i) within the same cluster (of 16 pipelines in this illustrative embodiment) and/or (ii) within another cluster of the same X1 processing component.

In another embodiment, the MAC execution pipelines may be made deeper by connecting the associated shifting chains in series whereby the multiply and accumulate operations are implemented concurrently with respect to related data. For example, with reference to FIG. 2B, in one exemplary embodiment, two or more MAC execution pipelines are configured as serial execution pipelines to concurrently process data. In this illustrative embodiment, the stage includes an input depth and an output depth which are equal or greater than 2*64 (i.e., greater than 2 time the size of the MAC execution pipeline). Here, two 64-MAC execution pipelines are connected serially to form a 128-MAC execution pipeline. The 128 MAC processing elements/circuits in this pipeline configuration operate concurrently. That is, in operation, the pipelines perform 128×128 MAC (multiply-accumulate) operations in each 128 cycle interval (a cycle may be nominally 1 ns). Thereafter, the next 128 input pixels are shifted-in and the previous 128 output pixels are shifted-out during the same 128 cycle interval. In an embodiment in which the depth is Dd=256, each 128 cycle interval processes a half-column (Dd=128) of input pixels at a particular (i,j) location (the indexes for the width Dw/Yw and height Dh/Yh dimensions). The 128 cycle execution interval is repeated twice for each of the Dw*Dh depth columns for this stage (conv16 in this example). The filter weights were loaded into the memory (e.g., L1/L0 SRAM memories) before the stage processing started (see, e.g., the '306 and '345 applications). In the exemplary embodiment illustrated in FIG. 2B, the input stage has Dw=256, Dh=128, and Dd=128, and the output stage has Yw=256, Yh=128, and Yd=128. Alternatively, in one embodiment, Dd=256.

Notably, as with the embodiment illustrated in FIG. 2A, the MAC execution pipelines of the embodiment illustrated in FIG. 2B may be located (i) within the same cluster (of 16 pipelines in this illustrative embodiment) and/or (ii) within another cluster of the same X1 processing component.

In one embodiment, multiplier-accumulator circuitry of a plurality of MAC execution pipelines implement or perform multiply and accumulate operations concurrently in connection with related image data of a plurality of stages of a frame. For example, with reference to FIG. 3, in one embodiment a plurality of multiplier-accumulator circuits of a first MAC execution pipeline process image data of a first stage (i.e., stage [i]) of a given frame. The processed data corresponding to stage [i] is stored in memory $Y_{MEM}$ (e.g., L2 memory—such as SRAM). While the processing of the data corresponding to the first stage continues, a plurality of multiplier-accumulator circuits of a second MAC execution pipeline starts processing image data corresponding to a second stage (i.e., stage [i+1]). The data corresponding to the second stage (i.e., stage [i+1]) is stored in memory $Y_{MEM}$/$D_{MEM}$. As such, the region of the memory (e.g., L2 memory) may be simultaneously used as output for stage [i] and input for stage [i+1].

The processing of data corresponding to stage [i] and stage [i+1] temporally overlap such that the MAC execution pipeline processes data of the stage [i+1] starts before the MAC execution pipeline finishes processing data of stage [i]. That is, the two MAC execution pipelines process the related data concurrently given that the data of stage [i] relates to the data of stage [i+1]—here, data of different stages of same image frame. The data of stage [i+1], as processed by the circuitry of the second MAC execution pipeline, is stored in memory $Y_{MEM}$ (e.g., L2 memory) as stage [i+2].

Figure 1C:
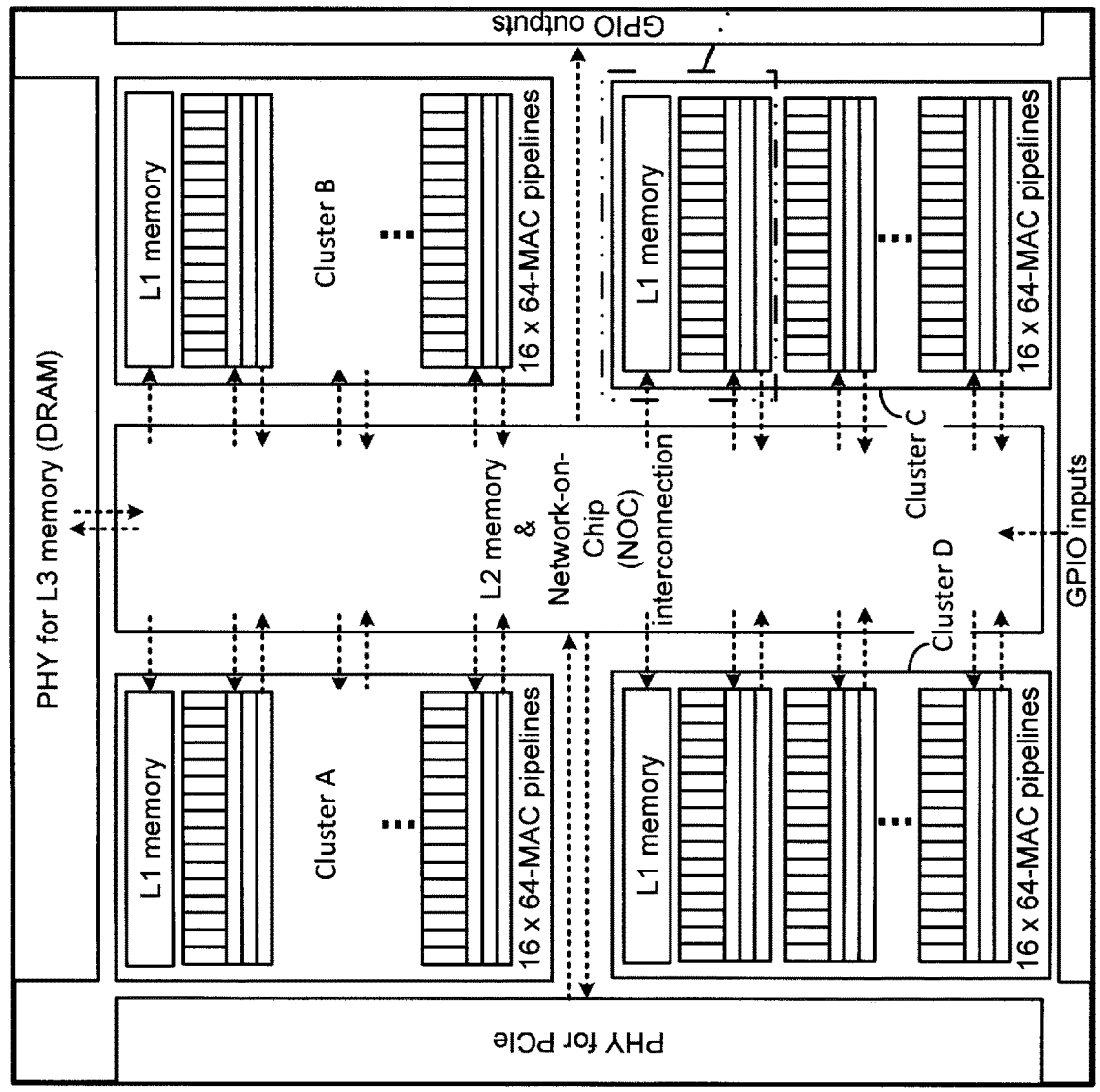

Notably, in the embodiment illustrated in FIG. 3, the processing of data of two related stages (or more), here successive stages, temporally overlap and, as such, the related data is processed concurrently. This temporal overlapping may provide a performance advantage in the form of reduced processing time, as with the configurations and processing techniques described/illustrated in the embodiments of FIGS. 1, 2A and 2B. That is, in the exemplary embodiments illustrated in FIGS. 1, 2A and 2B, the input pixels/data (i.e., Dw*Dh*Dd) of a given stage may be completely processed into the output pixels of the next stage before the starting the processing of data associated with that/successive next stage.

With continued reference to FIG. 3, each depth column Dijk of input pixels/data may be largely independent of other depth columns in the Dw and Dh dimensions. In this way, each depth column may be used and overwritten with a depth column from the next stage, thereby reducing the total memory (e.g., L2 memory) employed in the processing of each stage. Note that there may be a small dependency between adjacent depth columns with filter sizes larger than 1×1 (3×3, the most common larger size is an example of this).

Moreover, there are memory "footprints" or memory allocations shown for three stages: [i], [i+1], and [i+2]. (See FIG. 3). In this particular example, for simplicity, the three stages have identical dimensions: Dw/Yw=512, Dh/Yh=256, and Dd/Yd=64. The memory footprint/allocation of each stage, however, represents a partial subset of the full stage, represented as a highlighted strip on the right side of each of the Dw*Dh planes. Depth columns of input pixels are processed from stage [i] and written into output pixels of stage [i+1] at time T1.

At a later time T2, the control and sequencing logic transfers, communicates or moves to a different part of the input strip for stage [i] for the stage[i] to stage[i+1] processing. The control and sequencing logic for the second MAC execution pipeline may concurrently (at time T2) begin processing the stage [1+1] pixels/data into stage [i+2] pixels/data. The time lag (T2−T1) may provide a margin for managing the two concurrent processes.

Again, the MAC execution pipelines of the embodiment illustrated in FIG. 3 may be located (i) within the same cluster (of 16 pipelines in this illustrative embodiment) and/or (ii) within another cluster of the same X1 processing component. Moreover, the embodiment may include more than two MAC execution pipelines—e.g., the method illustrated in FIG. 3 may be extended with a third MAC execution pipeline processing the stage [i+2] image data into stage [i+3] image data. Indeed, additional MAC execution pipelines may also be employed to extend the larger processing pipeline further.

Notably, it may be advantageous to manage the amount of memory allocated to each of these concurrent processes to guard against or ensure the processes from over-running or under-running of the active memory footprint allocated to each stage. The memory (e.g., L2 memory) may also need to accommodate the adjacent pixel dependency for the case of 3×3 (and higher order) filtering for a stage. These constraints may be managed by the control and sequencing logic for each MAC execution pipeline.

FIG. 4A illustrates an exemplary embodiment of a concurrent operation of the NMAX execution pipeline (having the MAC processing elements (in this exemplary embodiment, 64)) concurrently operate the MAC execution pipelines with filtering of the input images/data (e.g., 3×3), according to certain aspects of the present inventions. In the exemplary embodiment of FIG. 4A, the input stage has Dw=512, Dh=256, and Dd=64, and the output stage has Yw=512, Yh=256, and Yd=64. Here, each MAC execution pipeline performs 9×64×64 MAC (multiply-accumulate) operations in each 9×64 cycle interval (a cycle is nominally 1 ns). Moreover, each of 9 sets of 64 input pixels/data are shifted-in during one 64-cycle interval. The previous 64 output pixels are shifted-out during a single 64 cycle interval. Each 9×64 cycle interval processes a Dd/Yd (depth) column of input pixels/data at a particular (i,j) location (the indexes for the width Dw/Yw and height Dh/Yh dimensions). Each 9×64 cycle interval produces a half-depth (64) of output pixels. The 9×64 cycle execution interval is repeated twice for each of the Yw*Yh depth columns for this stage (conv10 in this example). The filter weights or data may be loaded into memory (e.g., the L1/L0 SRAM memories) before stage processing is started.

The pseudo-code illustrated in FIG. 4B is similar to the code illustrated in FIG. 1B, with the exception of the inner loop wherein an index "m" has been added. The loop of FIG. 4B provides/illustrates the accumulation of the products Uijklm of Dijkm input pixels/data and Fklm filter values into temporary sums Vijkl. The temporary sums Vijkl are then accumulated into the final output pixel/data values Yijl.

Note, the two accumulation loops of the pseudo-code illustrated in FIG. 4B may be implemented in alternate, equivalent orders (i.e. the order of the "m" and "k" loops). There are 9×64 products Uijklm that are accumulated into a single Yijl value, and the control and sequencing logic for the 64 MAC execution pipeline may implement any order— e.g., the most convenient order.

Further, in connection with the 9×64 execution cycles that are employed to perform 9×64×64 MAC operations, there are 9×64 input pixel/data values read from memory (e.g., the Dmem region of L2), and 64 output pixel values written to memory (e.g., the Ymem region of L2). (See FIG. 4A).

Notably, in one embodiment, the concurrent operations implementing a filtering of the input images/data as set forth in the exemplary embodiment of FIG. 4A may include or implement pipelined concurrent processing techniques (see FIG. 1A), parallel concurrent processing techniques (see FIG. 2A), serial concurrent processing techniques (see FIG. 2B), or overlap concurrent processing techniques (see FIG. 3); all combinations and permutations are intended to fall within the scope of the present inventions.

As mentioned above, the present inventions may also be employed or be implemented in conjunction with the circuitry and techniques multiplier-accumulator execution or processing pipelines including circuitry to implement Winograd type processes to increase data throughput of the multiplier-accumulator circuitry and processing (see the '111 and '161 applications). With that in mind, FIG. 5 illustrates an exemplary embodiment of concurrent processing technique, based on Winograd type processing, employing multiplier-accumulator circuits of one or more MAC execution pipelines having conversion logic implement Winograd type processes, according to certain aspects of the present inventions. Here, each MAC pipeline handles one word of all of the (e.g., 16) words (m) in each dij group during each group interval (e.g., 64 ns). In one embodiment, the architecture of FIG. 5 implements processing that is functional equivalent to that illustrated in FIG. 4. In this exemplary embodiment, the MAC pipelines perform 16×64×64 MAC operations in a 64 cycle interval (16/9 more than method FIG. 4), but produces more 256 output pixels in this interval (four times more than the 64 pixels of the method illustrated in FIG. 4)—as described in the '111 and '161 applications.

Notably, in one embodiment, the concurrent operations implementing Winograd type processing in connection with the input images/data, as set forth in the exemplary embodiment of FIG. 5, may include or implement pipelined concurrent processing techniques (see FIG. 1A), parallel concurrent processing techniques (see FIG. 2A), serial concurrent processing techniques (FIG. 2B), or overlap concurrent processing techniques (see FIG. 3); all combinations and permutations are intended to fall within the scope of the present inventions. Here, the MAC execution pipelines of the X1 component(s) may implement the Winograd processing via any of the architectures or configurations set forth in the exemplary embodiments of FIGS. 1A, 2A, 2B, 3, 4A and 7B. Here, such architectures or configurations would be modified to, for example, include conversion circuitry to implement the Winograd processing techniques. Notably, the MAC execution pipelines may be located (i) within the same cluster (of 16 pipelines in this illustrative embodiment) and/or (ii) within another cluster of the same X1 processing component.

In another aspect of the present inventions, the one or more integrated circuits may include a plurality of components (e.g., 2, 4, . . . ), wherein each component includes a plurality of clusters and each cluster includes a plurality of MAC execution pipelines (e.g., 16). For example, in one embodiment, one integrated circuit includes a plurality of components or X1 components (e.g., 4 clusters) wherein each cluster includes a plurality of execution or processing pipelines (e.g., 16, 32 or 64) which are configured to process, function and/or operate concurrently such that related data is processed by each of the execution pipelines of a plurality of the clusters concurrently to, for example, decrease the processing time of the related data and/or increase data throughput of the X1 components.

Indeed, in one embodiment, a plurality of execution or processing pipelines of each of the clusters of a plurality of the X1 components may be interconnected, for example, in a ring configuration or architecture, via a ring bus, to concurrently process related data (e.g., image data). Here, a plurality of MAC execution pipelines of one or more (or all) of the clusters of a plurality of X1 components (which may be integrated/manufactured on a single die or multiple dice) may be interconnected in a ring configuration or architecture to concurrently process related data.

For example, a plurality of MAC execution pipelines of one or more (or all) of the clusters of each X1 component are configured to process one or more stages of an image frame such that circuitry of each X1 component processes one or more stages of each image frame of a plurality of image frames. In another embodiment, a plurality of MAC execution pipelines of one or more (or all) of the clusters of each X1 component are configured to process one or more portions of each stage of each image frame such that circuitry of a plurality of X1 component are configured to process only a portion of each stage of each image frame of a plurality of image frames—wherein together the processing components process all of the stages of the entire image frame. In yet another embodiment, a plurality of MAC execution pipelines of one or more (or all) of the clusters of each X1 component is configured to process all of the stages of an entire image frame. Here, the circuitry of MAC execution pipelines of each X1 component process a different image frame of the plurality of image frames.

In this embodiment, however, a plurality (or all) of the execution or processing MAC pipelines of each of the clusters of each of the components may be configured to function or operate and/or process image data concurrently, including, for example, those configurations set forth in the exemplary embodiments of FIGS. 2A, 2B and/or 3. In addition, the components (including a plurality (or all) of execution or processing pipelines of the clusters of each processing component) may be interconnected, for example, in a ring configuration or architecture. Here, the plurality of components may share resources, for example, (i) one or more bus interfaces (e.g., a PHY and/or GPIO) to facilitate communication with circuitry external to the plurality of component and/or (ii) memory (e.g., SRAM and DRAM) for storage and use by the circuitry of the components during, for example, operation of the MAC processing pipelines.

Notably, a plurality of the processing components may be disposed on separate die and/or on the same die—all combinations are intended to call within the scope of the present inventions. Where one or more (or all) of the processing components may be disposed on separate die, the components may be disposed on a printed circuit board (PCB) and/or organized in a stacked die configuration. Indeed, the plurality/multiple of X1 components may be integrated or incorporated into a system via several "packaging" or "integration" alternatives. Such alternatives provide a range of wiring connections, which may provide guidance for the external signaling bandwidth. For example, [1] FR4/PCB (printed circuit board) substrate with BGA (ball grid array) packaged devices (typically 300-1000u substrate wire pitch), [2] silicon substrate (or equivalent) with C4 packaged silicon die directly attached (typically 100-300u substrate wire pitch), [3] package-stacked devices, typically with wire-bonded connection between silicon die stacked together in a package (typically 50u-200u wire pitches), and [4] die-stacked devices, with silicon die stacked and connected with vertical through-die vias in a package (typically 10u-50u wire pitches. These alternatives provide a range of external memory capacities and bandwidths and different interconnection bandwidths between the processing components. The amount of connection bandwidth will determine the usefulness of the various concurrency methods for multiple processing components. In the figures, the processing components are often depicted for illustrative purposes as identical (see FIGS. 6A-6C)—although it should be noted the processing components may be different (e.g., include different external interface circuitry). Moreover, in many of the embodiments, the processing system includes four processing components—although more or less processing components may be employed (e.g., 2, 3, 5, 6, etc.). As noted above, such processing components are often referred to in the text and identified in the figures as "X1 component" or "X1".

With reference to FIG. 6A, the processing system may include a plurality of processing or X1 components, each component including a plurality of multi-bit MAC execution pipelines having a plurality of multiplier-accumulator circuits each of which implement multiply and accumulate operations. The MAC execution pipelines and/or the plurality of multiplier-accumulator circuits may be configured to implement one or more processing architectures or techniques (singly or in combination with one or more X1 components). As noted above, the MAC execution pipelines are organized into clusters (in this illustrative embodiment, four clusters wherein each cluster includes a plurality of multi-bit MAC execution pipelines (in this illustrative embodiment each cluster includes 16, 64-MAC execution pipelines)). In one embodiment, the plurality of multiplier-accumulator circuitry are configurable or programmable (one-time or multiple times, e.g., at start-up and/or in situ) to implement one or more pipelining processing architectures or techniques (see, e.g., the expanded view of a portion of the high-level block diagram of FIG. 1C in the lower right is a single 64-MAC execution pipeline illustrated in FIG. 1A). The X1 components in this illustrative embodiment may include memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines.

In one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers. In one embodiment, one or more (or all) of the clusters includes one or more computing elements (e.g., a plurality of multiplier-accumulator circuitry—labeled as "NMAX Rows"—see, e.g., the '306 and '345 applications). As noted above, in one embodiment, each MAC execution pipeline has dedicated L0 memory (e.g., SRAM memory), and a plurality (e.g., 16) MAC execution pipelines of a MAC cluster share L1 memory (e.g., SRAM memory). The NOC may couple to the L2 memory to the PHY (physical interface) which may connect to L3 memory (e.g., external DRAM). The NOC may also couple to a PCIe or PHY which, in turn, may provide interconnection to or communication with circuitry external to the X1 component (e.g., another X1 component and/or an external processor, such as a host processor). The NOC, in one embodiment, may also connect a plurality of X1 components (e.g., via GPIO input/output PHYs) which allow multiple X1 components to process related data (e.g., image data) concurrently, as discussed herein.

With reference to FIGS. 6A-6C, the plurality of X1 components may be disposed on an integrated circuit die, a portion of an integrated circuit die, and/or a printed circuit board or other substrate. The plurality of X1 components may be controllable or programmable (e.g., in situ or at start-up/power-up). Moreover, the interconnection (e.g., point-to-point or bus such as multi-drop, ring, star, etc.) between the circuitry of the X1 components, and/or the operation(s) thereof, may be controllable or programmable to, for example, implement coordinated data processing operations. Indeed, the circuitry of each of the X1 components (e.g., the circuitry of the MAC execution pipelines) may be configurable or programmable (e.g., one-time or multiple times—such as, in situ (i.e., during operation of the integrated circuit) and/or at or during power-up, start-up, initialization, re-initialization, configuration, re-configuration or the like). As intimated above, the X1 components may or may not be identical in structure, circuitry, architecture and/or configuration. Each X1 component, however, includes a plurality of multi-bit MAC execution pipelines having a plurality of multiplier-accumulator circuits each of which implement multiply and accumulate operations.

With continued reference to FIGS. 6A-6C, the processing components may be interconnected via a bus interface (e.g., GPIO interface). In the illustrative embodiments of FIGS. 6B, 6C and 7A, the components are connected in a ring (see the dashed lines disposed over the components (which are identified as "X1", "X1A", "X1B", "X1C" and "X1D"). Notably, the ring topology is employed for illustrative purposes here because, for example, it is symmetric, and the links are point-to-point and unidirectional. The present inventions may employ other architectures, topologies and connection methods are suitable—all of which are intended to fall within the scope of the present inventions. For example a star topology or multi-drop bus topology may be employed to interconnect a plurality of components. In addition, the interconnection conductors or links may be unidirectional or bidirectional. In general, the impact on the performance of the processing system may be the signaling bandwidth of the individual links between the X1 components. The choice of how to manage or control these links may have less impact, and alternatives to the ring topology are available and may be more suitable or advantageous when considering other criteria or factors.

In the one embodiment, each bus interface is unidirectional with a plurality e.g., 16) conductors/wires and clock/control, and operating at a common signaling rate (e.g., 150 Mb/s). This provides a transport bandwidth between the individual X1 components (whether disposed on a common die or on a PCB). Notably, other interconnection architectures or designs may be employed, which may increase the bandwidth by 10-30×, allowing much higher performance levels. Again, all architectures, topologies, designs and communication techniques to connect a plurality of X1 components, whether now known or later developed, are intended to fall within the scope of the present inventions.

With continued reference to FIGS. 6B, 6C and 7A, in one embodiment, only one of the X1 components (i.e., X1A) is connected directly to the interface that provides connection to circuitry external to the components (e.g., a PCIe interface of, for example, the PCB). The number of interfaces (for example, PCIe interfaces) that connect to such external circuitry (e.g., a processor or controller) are often limited, and the bandwidth provided by one interface (four transmit links and four receive links at 8 Gb/s) will provide 4 GB/s in each direction. Such a configuration may provide sufficient bandwidth to move pixel/image data between, for example, a processor and the plurality of components—wherein the "bottleneck" in the configuration will likely generally be the communication of data via the ring bus.

With reference to FIGS. 7A, 7C-7E, the system including a plurality of processing components (in this exemplary illustration, four X1 components), may be configured to implement concurrently processing of a plurality of images frames, each image frame including a plurality of stages, wherein each stage includes a plurality of related image data. Here, a plurality of related image data is processed concurrently via a plurality of multiplier-accumulator execution pipelines of the plurality of X1 components (see FIG. 7B) wherein the plurality of X1 components are interconnected via a ring bus (see, e.g., FIG. 7A).

In one embodiment, a plurality of MAC execution pipelines in each of the X1 components processes a plurality of different stages of an image frame. (See, e.g., FIG. 7C). Here, each group of stages of each frame is processed by a plurality of MAC execution pipelines of one or more (or all) of the clusters of different X1 component. In the illustrative embodiment of FIG. 7C, each group of stages is processed by a plurality of MAC execution pipelines of one or more (or all) of the clusters of a different processing components X1A, X1B, X1C and X1D. (Stage 000 to Stage 029 is processed by component X1A, Stage 030 to Stage 059 is processed by component X1B, Stage 060 to Stage 089 is processed by component X1D, and Stage 090 to Stage 119 is processed by component X1C). The processing of each group of stages of each frame may be concurrent relative to the processing of other groups of stages of each frame.

In another embodiment, a plurality of MAC execution pipelines of one or more (or all) of the clusters of each X1 component are configured to process a portion of each stage of each image frame such that circuitry of a plurality of X1 component are configured to process only a portion of each stage—wherein taken together the processing components process all of the stages of the entire image frame. (See, e.g., FIG. 7D). In the illustrative embodiment of FIG. 7D, each stage is processed by a plurality of MAC execution pipelines of one or more (or all) of the clusters of processing components X1A, X1B, X1C and X1D. (See Inset A). The processing of each portion of each stage may be concurrent relative to the processing of other portions of the associated stage.

In yet another embodiment, a plurality of MAC execution pipelines of one X1 component is configured to process all of the stages of an entire image frame. See, e.g., FIG. 7E). Here, the circuitry of MAC execution pipelines of each X1 component process a different image frame of the plurality of image frames. The processing of the frames may be concurrent—that is, MAC execution pipelines of each X1 component may process the data of each stage concurrently with respect to the processing of other frames by the other X1 components of the system.

Notably, in one embodiment, a plurality of execution or processing pipelines of each of the clusters of a plurality of the X1 components may be interconnected, for example, in a ring configuration or architecture to facilitate concurrently process related data (e.g., image data). Moreover, in one embodiment, the processing pipelines of each X1 component may be configured to implement the processing technique as illustrated in FIG. 7B or FIG. 1A. As discussed above, however, the processing pipelines of each X1 component may be configured, for example, in a parallel concurrent processing configuration (see, e.g., FIG. 2A), a serial concurrent processing configuration (see, e.g., FIG. 2B), or overlap concurrent processing configuration (see, e.g., FIG. 3). The MAC execution or processing pipelines (each having a plurality of multiplier-accumulator circuits) of the X1 components may be configured, for example, as illustrated in FIGS. 4A and 5 to implement the filtering operations; all combinations and permutations are intended to fall within the scope of the present inventions. Indeed, the configuration(s) of the processing pipelines employed in each X1 component may be the same or different within each X1 component as well as between X1 components; again, all combinations and permutations are intended to fall within the scope of the present inventions.

Synthetic Benchmark and Assumptions: the performance analysis used here relies on a synthetic convolutional neural network ("CNN") benchmark that resembles the YOLOv3 CNN. This synthetic benchmark assumes there are 120 stages per frame (YOLOv3 has 106), each stage requires 1.66×2^30 MAC operations per stage (YOLOv3 has an average of about 1.4×2^30 in embodiments implementing Winograd type processing techniques), and each stage has an input image and an output image that are both 16 MB in size (most of the YOLOv3 frames are 2, 4, 8, or 16 MB in size). The uniform structure of the synthetic CNN makes it easier to analyze the architectural performance of the concurrent execution methods.

In addition, for the purposes of, for example, analysis, it is assumed that each X1 component has 4K MAC execution elements, with each performing one MAC operation per nanosecond, and the ring bandwidth is 300 MB/s for the initial analysis. With these assumptions, the time for one X1 component to process 120 stages of one image frame is tEXEC~50 ms, and the time for the ring bus to transfer one stage of image data (16 MB) across one ring link is tXFER~50 ms.

With reference to FIGS. 7A-7C, an exemplary embodiment of a method of processing wherein a stack of image frames (FIG. 7C) represent the amount of "work" to be done (i.e., data to be processed). In this exemplary embodiment, each frame has 120 stages (16 stages are illustrated, with the remainder implied in the drawing), with each stage consisting of Dd image planes, with each image/data plane Dw*Dd, such that Dd*Dw*Dh=16 MB. Note that the output image/data from the execution pipelines of each X1 component will have the same Yd*Yw*Yh=16 MB size.

With continued reference to FIGS. 7A-7C, the stages (e.g., 120) are divided between the four X1 components, with each component processing 30 stages before communicating, outputting and/or passing the data of the final stage to the next X1 component for the next 30 stages. This process continues until the data of the final stage is communicated, output and/or passed back to the X1 with the bus interface (e.g., PCIe interface) that connects to external circuitry (e.g., processor).

Method MB1: FIGS. 7A, and 7D, in combination, illustrate an exemplary embodiment of processing wherein each of stage (e.g., 120 stages) of each frame is divided into sections (in this example, four—one for each of X1 components—using the Dw and Dh dimensions). Here, one or more (or all) of the processing pipelines of each X1 component processes the image pixels/data corresponding to its section of the stage. (See, e.g., FIG. 7B; although other configurations of the MAC execution pipelines of the X1 component(s) may be employed—including, e.g., architectures or configurations set forth in the exemplary embodiments of FIGS. 1A, 2A, 2B, 3, 4A and 5). In one embodiment, pixels/data at the boundary may be shared for layers that perform 3×3 filtering operations. In operation, the first stage may be input or provided into the four X1 components (via, for example, an external processor) before processing of the first stage starts, and the last (120th) stage would be communicated, moved or output back to external circuitry (e.g., an external processor or memory) from the X1 components. Other than this initial and final movement and the boundary sharing, the image pixels will stay within the same X1 component for processing; that is, the same X1 component will process such image pixels.

Method MC1: FIGS. 7A and 7E, in combination, illustrate an exemplary embodiment of processing wherein each frame (with 120 stages) is allocated for processing by a different X1 component. Here, the MAC execution or processing pipelines of each component process all the image pixels of all stages in the frame. FIG. 7B illustrates an exemplary configurations of the MAC execution pipelines of the X1 component(s); although other configurations of the MAC execution pipelines of the X1 component(s) may be employed—including, e.g., architectures or configurations set forth in the exemplary embodiments of FIGS. 1A, 2A, 2B, 3, 4A and 5). Notably, the first stage may be input or provided into the associated X1 component (via, for example, an external processor) before the processing of the first stage starts, and the last (120th) stage would be communicated, moved or output back to external circuitry (e.g., an external processor or memory) from each of the X1 components.

Method MA1: Temporal decomposition example w/coarse scaling (E2=1×1); FIG. 8A illustrates an exemplary timing diagram of the embodiment of processing the image pixels/data of FIG. 7C (i.e., wherein X1 component (having a plurality of clusters and each cluster includes a plurality of MAC execution pipelines—see, e.g., the configuration of FIGS. 7A and 7B)) processes all 30 stages before communicating, writing and/or sending the final output stage to the next X1 component. That is, the stages (e.g., 120) are divided between the four X1 components, with plurality of MAC execution pipelines of each component processing stages before communicating, outputting, transferring and/or passing the data of the final stage to the next X1 component for processing of the next stages.

With reference to FIG. 8A, in the exemplary timing, each X1 component (see FIG. 7A, and also FIG. 7B regarding an exemplary MAC execution pipeline and FIG. 7C regarding the exemplary processing technique of the stages of the frames) uses 12.5 ms for its 30 stage execution pipeline to process the data, and 50 ms to transfer and/or output the pixel/data of the last stage to the execution pipelines of the next X1 component. This is repeated four times—for each of the components of the system/architecture—for a total of 250 ms of batch 1 latency. Notably, 50 ms of this process is execution time and 200 ms is data transfer or transport time.

The performance here may be better, since four frames can be processed in the same 250 ms interval. In fact, with a small amount of buffering at the ring bus interfaces, five frames may be processed in 250 ms, making the concurrent batch5 performance of the four X1 components equal to four times the single X1 performance with a ring bus of very moderate bandwidth.

Method MA2—Temporal decomposition example with fine scaling ($E^2=2\times2$); to FIG. 8B illustrates an exemplary timing diagram of the embodiment of processing the image pixels/data of FIG. 7B (i.e., wherein each X1 component (having a plurality of clusters and each cluster includes a plurality of MAC execution pipelines—see, e.g., the configuration of FIGS. 7A and 7C)) processes ¼th of all stages before sending ¼th of the final output stage to the next X1 component. Here, each X1 component uses 12.5 ms for each ¼th of the 30 stage execution pipeline, and 12.5 ms to transfer ¼th of the last stage to the next X1 component. This process is repeated four times. Notably, as indicated above, this embodiment may employ the MAC execution pipeline configuration of FIG. 7B; although other MAC execution pipeline configurations may be implemented—including, for example, an overlapping processing technique and configuration in relation to its operations with the processing operations performed in the next X1 component. (See, e.g., FIG. 3).

Method MA4—Temporal decomposition example with "finer" scaling (E2=4×4): FIG. 8C illustrates an exemplary timing for a case in which an X1 component processes ¹⁄₁₆th of all 30 stages before sending ¹⁄₁₆th of the final output stage to the next X1 component (see, e.g., the configuration of FIGS. 7A, 7B and 7D). Here, each X1 component uses 3.125 ms for each ¹⁄₁₆th of the 30 stage execution pipeline, and 3.125 ms to transfer ¹⁄₁₆th of the last stage to the next X1 component. This process is repeated 16 times. Notably, as noted above, this embodiment may employ the MAC execution pipeline configuration of FIG. 7B; although other pipeline configurations may be implemented—including, for example, an overlapping processing technique and configuration in relation to its operations with the processing operations performed in the next X1 component. (See, e.g., FIG. 3).

Notably, FIGS. 7A-7C and 9A illustrate exemplary timing of the MA2 method (i.e., timing with fine scaling ($E^2=2\times2$)) in which an X1 component processes ¼th of all 30 stages before sending ¼th of the final output stage to the next X1 component. Moreover, FIG. 9B illustrate exemplary timing of the MA4 method (i.e., timing with fine scaling ($E^2=2\times2$)) in which an X1 component processes 1/16th of all 30 stages before sending 1/16th of the final output stage to the next X1 component. Again, each X1 component uses 3.125 ms for each 1/16th of the 30 stage execution pipeline, and 3.125 ms to transfer 1/16th of the last stage to the next X1 component.

Method MB—Dataflow summary for 4×X1 components: FIG. 10 illustrates an embodiment of processing method segments, divides and/or splits the processing of each stage between the four of the X1 components. Here, each set of input pixels/data at an (i,j) position (in the Dw,Dh planes) is converted into a set of output pixels/data at the (i,j) position (in the Yw,Yh planes) before processing is completed at that position for the next stage.

Notably, with continued reference to FIG. 10, the pixels/data at each (i,j) position are independent (except for adjacent positions for 3×3 filtering), so that, in one embodiment, concurrent processing or operations in the four quadrants of the stage may be implemented. That is, the processing pipelines of each X1 component may be configured, for example, in a parallel concurrent processing configuration (see, e.g., FIG. 2A), a serial concurrent processing configuration (see, e.g., FIG. 2B), or overlap concurrent processing configuration (see, e.g., FIG. 3). The MAC execution or processing pipelines (each having a plurality of multiplier-accumulator circuits) of the X1 components may be configured, for example, as illustrated in FIGS. 4A and 5 to implement the filtering operations; all combinations and permutations are intended to fall within the scope of the present inventions. Indeed, the configuration(s) of the processing pipelines employed in each X1 component may be the same or different within each X1 component as well as between X1 components.

Transfer or transport overhead between the X1 components may be considered for the situation where 3×3 filtering is employed. This case is shown in FIG. 10, with the added assumption of implementing Winograd processing techniques/circuitry. In each quadrant in each X1 component, one horizontal edge and one vertical edge of input image pixels/data is exchanged with the adjacent X1 component. This exchange operation may proceed in parallel with processing of the interior pixels/data, but this transport delay is completed within the execution time of each quadrant. In one exemplary embodiment, the execution time will be 0.1 ms/stage for the synthetic CNN, and the exchange delay per stage will be approximately 0.1 ms (2^15B/300 MB/s). Note that this assumes the ring bus direction can be reversed with a time granularity of about 100 us or better.

Notably, there may also be transport delay at the beginning and the end of the frame processing, in which the first stage is received from external circuitry (e.g., a processor) and the last stage is returned to the external circuitry—this will require an additional 50 ms per frame (~16 MB/300 MB/s).

Method $M_{C2}$—X1 components process different frames: FIGS. 7A, 7B, 7E and 11A, in combination, illustrate additional details for embodiment of processing wherein each frame (with 120 stages) is allocated for processing by a different X1 component (see, FIG. 7C). This is seen by the label at the edge of each frame in the frame stack. Here, the execution or processing MAC pipelines of each component processes all the image pixels of all stages in its frame. Notably, the first stage may be input or provided into the associated X1 component (via, for example, an external processor) before the processing of the first stage starts, and the last (120th) stage would be communicated, moved or output back to external circuitry (e.g., an external processor or memory) from each of the X1 components. As with Method MB1, other than this initial and final movement and the boundary sharing, the image pixels will stay within the same X1 component for processing.

In one embodiment, Method $M_{C2}$ refers to the pipelined timing used for batch=4 operation. In the timing diagram of FIG. 11A, the waveforms have approximately a 50 ms granularity, and show the occupancy of an external bus (e.g., a PCIe host bus), the four ring nodes R[3:0], and the execution activity of the four components X1[3:0]. Note that X1[0] is the component that connects to the external circuitry (e.g., a host processor).

The $M_{C2}$ example assumes that the ring bus bandwidth is 300 MB/s, and employs about 50 ms to transfer the initial stage from the X[0] component to the component that performs the processing on that stage. It requires about 50 ms to perform the processing of the frame, and another 50 ms to return the final stage to the external circuitry (e.g., a host processor). With these assumptions, four X1 components may process four frames in 250 ms, or about 16 frame/sec.

Method $M_{C4}$—X1 components process different frames: FIGS. 7A, 7B, 7E and 13, in combination, illustrate the detail for example $M_{C4}$. This embodiment is similar to the previous $M_{C2}$ embodiment, except the bandwidth of the ring bus is increased to 600 MB/s (2× increase). In this embodiment, about 12.5 ms are employed to transfer the initial stage from the X[0] component to the X1 component that performs the processing of that stage. Further, about 50 ms is used to perform the processing of the frame, and another 12.5 ms to return the final stage to the external circuitry (e.g., processor). With these assumptions, the four X1 components may process four frames in 50 ms, or about 80 frame/sec.

Method $M_{C5}$—X1 components process different frames: FIGS. 7A, 7B, 7E and 11C, in combination, illustrate details for example $M_{C5}$. This exemplary embodiment is similar to the $M_{C2}$ embodiment illustrated in FIG. 11A except that the ring bus bandwidth has been increased to 450 MB/s (1.5× increase). With that in mind, it now uses about 16.6 ms to transfer the initial stage from the X[0] component to the component which performs the processing of that stage. Further, about 50 ms transpires to perform the processing of the frame, and another 12.5 ms to return the final stage to the external circuitry (e.g., processor). With these assumptions, four X1 components may process four frames in 50 ms, or about 80 frame/sec.

Note that example $M_{C5}$ may have better performance than example $M_{C4}$. This may be due to the fact that it takes advantage of the fact that the no initial or final stage needs to be transferred on the ring bus for the frames that are processed by X1[0]. It also relies on the fact that the host PCIe bus has considerably higher bandwidth than the ring bus, and can transfer an initial or final stage in about 2 ms, compared to about 16.6 ms for the ring bus.

Consequently, if ring bus transfer time (16.6 ms) is set to be about 1/3 the frame execution time for a single X1 component (50 ms), then the pipelining of the ring bus nodes and the X1 components will be fully occupied with no gaps. The pipeline diagrams for the previous $M_{C4}$ example show gaps in the ring bus nodes R[3:0].

A potential downside of this modification of ring bus bandwidth is that the X1[0] component will provide buffering so it can receive and transmit two sets of stage data in a single 16.6 ms interval. This can be seen in the first interval for PCIin in which the C0in and C1in stage data is received; the next two intervals the PCIin needs only to receive one set of stage data.

Method $M_{C1}/M_{C3}$—X1 components process different frames: FIGS. 12A and 12B illustrate batch=4 timing for example $M_{C2}$ and $M_{C4}$ and show the batch=1 timing for example $M_{C1}$ and $M_{C3}$. The batch=1 timing will for both cases will process one frame (in the X1[0] component) in each 50 ms interval, or 20 frame/s. Notably, the $M_C$ methods in these embodiment do not implement concurrent processing within a single/one frame, and do not exceed the 20 frame/s performance number for batch=1 processing.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

For example, the plurality of X1 components may be integrated or incorporated into a system via many "packaging" or "integration" alternatives, including, for example, (i) fabricating a plurality of X1 components on a die or on dice, (ii) disposing, fixing or placing a plurality of X1 components on a PCB, and/or (iii) die-stacking a plurality of X1 components. (See, e.g., FIG. 13A-13E). Notably, all X1 component packaging and integration architectures, including component interconnection architectures (e.g., ring, star or multi-drop bus configurations), are intended to fall within the scope of the present inventions.

Moreover, as mentioned above, the plurality of MAC execution pipelines (each having a plurality of multiplier-accumulator circuits) of a plurality of interconnected X1 components may be configured to perform multiply and accumulate operations according to any of the aspects of the present inventions including, for example, the processing configurations such as those set forth in the exemplary embodiments of FIGS. 1A, 2A, 2B, 3, 4A, 5 and 7B. Moreover, the configuration(s) of the processing pipelines employed in each X1 component may be the same or different within each X1 component as well as between X1 components; all combinations and permutations are intended to fall within the scope of the present inventions.

Notably, various circuits, circuitry and techniques disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, circuitry, layout and routing expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other formats and/or languages now known or later developed. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits, circuitry and techniques disclosed herein may be represented via simulations using computer aided design and/or testing tools. The simulation of the circuits, circuitry, layout and routing, and/or techniques implemented thereby, may be implemented by a computer system wherein characteristics and operations of such circuits, circuitry, layout and techniques implemented thereby, are imitated, replicated and/or predicted via a computer system. The present inventions are also directed to such simulations of the inventive circuits, circuitry and/or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" (or the like) means that a particular feature, structure, or characteristic described in connection with the embodiment may be included, employed and/or incorporated in one, some or all of the embodiments of the present inventions. The usages or appearances of the phrase "in one embodiment" or "in another embodiment" (or the like) in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as "exemplary" is not to be construed as ideal, preferred or advantageous, for example, over other embodiments or implementations; rather, it is intended convey or indicate the embodiment or embodiments are example embodiment(s).

Although the present inventions have been described in certain specific aspects, many additional modifications and variations would be apparent to those skilled in the art. It is therefore to be understood that the present inventions may be practiced otherwise than specifically described without departing from the scope and spirit of the present inventions. Thus, embodiments of the present inventions should be considered in all respects as illustrative/exemplary and not restrictive.

The terms "comprises," "comprising," "includes," "including," "have," and "having" or any other variation thereof, are intended to cover a non-exclusive inclusion, such that a process, method, circuit, article, or apparatus that comprises a list of parts or elements does not include only those parts or elements but may include other parts or elements not expressly listed or inherent to such process, method, article, or apparatus. Further, use of the terms "connect", "connected", "connecting" or "connection" herein should be broadly interpreted to include direct or indirect (e.g., via one or more conductors and/or intermediate devices/elements (active or passive) and/or via inductive or capacitive coupling)) unless intended otherwise (e.g., use of the terms "directly connect" or "directly connected").

The terms "a" and "an" herein do not denote a limitation of quantity, but rather denote the presence of at least one of the referenced item. Further, the terms "first," "second," and the like, herein do not denote any order, quantity, or importance, but rather are used to distinguish one element/circuit/feature from another.

In addition, the term "integrated circuit" means, among other things, any integrated circuit including, for example, a generic or non-specific integrated circuit, processor, controller, state machine, gate array, SoC, PGA and/or FPGA. The term "integrated circuit" also means, for example, a processor, controller, state machine and SoC—including an embedded FPGA.

Further, the term "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

In the claims, the term "MAC circuit" means a multiplier-accumulator circuit of the multiplier-accumulator circuitry of the multiplier-accumulator pipeline. For example, a multiplier-accumulator circuit is described and illustrated in the exemplary embodiment of FIGS. 1A-1C of U.S. patent application Ser. No. 16/545,345, and the text associated therewith. Notably, however, the term "MAC circuit" is not limited to the particular circuit, logical, block, functional and/or physical diagrams, block/data width, data path width, bandwidths, and processes illustrated and/or described in accordance with, for example, the exemplary embodiment of FIGS. 1A-1C of U.S. patent application Ser. No. 14/545,345, which, as indicated above, is incorporated by reference.

Notably, the limitations of the claims are not written in means-plus-function format or step-plus-function format. It is applicant's intention that none of the limitations be interpreted pursuant to 35 USC § 112, ¶6 or § 112(f), unless such claim limitations expressly use the phrase "means for" or "step for" followed by a statement of function and void of any specific structure.

What is claimed is:

1. An integrated circuit comprising:
one or more processing components, wherein each processing component includes:
first memory to store image data;
a plurality of multiplier-accumulator execution pipelines, coupled to the first memory, wherein each multiplier-accumulator execution pipeline includes a plurality of multiplier-accumulator circuits to, in operation, perform multiply and accumulate operations, wherein the plurality of multiplier-accumulator execution pipelines includes:
a first multiplier-accumulator execution pipeline configured to: (i) input first data, (ii) perform a first plurality of multiply and accumulate operations using the first data and a first set of filter weights, and (iii) output first processed data to the first memory, wherein the first processed data are stored therein, and
a second multiplier-accumulator execution pipeline configured to: (i) input second data from the first memory, wherein the second data includes the first processed data, (ii) perform a second plurality of multiply and accumulate operations using the second data and a second set of filter weights, and (iii) output second processed data;
wherein, in operation, the first multiplier-accumulator execution pipeline performs a portion of the first plurality of multiply and accumulate operations concurrently with respect to performance of the second plurality of multiply and accumulate operations by the second multiplier-accumulator execution pipeline; and
wherein the first memory simultaneously (i) stores a first portion of the first processed data output by the first multiplier-accumulator execution pipeline and (ii) outputs a portion of the second data to the second multiplier-accumulator execution pipeline, wherein the portion of the second data output to the second multiplier-accumulator execution pipeline includes a second portion of the first processed data.

2. The integrated circuit of claim 1 wherein:
first processed data corresponds to a first stage of an image frame and the second processed data corresponds to a second stage of the image frame, wherein the first and second stages are successive stages of the image frame.

3. The integrated circuit of claim 1 wherein:
the first memory is L2 memory.

4. The integrated circuit of claim 1 wherein:
the first memory includes a plurality of regions, including a first region, and
wherein the first region of the first memory, in operation, simultaneously (i) stores the first processed data output by the first multiplier-accumulator execution pipeline and outputs the second data, which includes the first processed data, to the second multiplier-accumulator execution pipeline during performance of the first plurality of multiply and accumulate operations by the first multiplier-accumulator execution pipeline and second plurality of multiply and accumulate operations by the second multiplier-accumulator execution pipeline.

5. The integrated circuit of claim 1 further including:
second memory to stores the first set of filter weights and the second set of filter weights, wherein the second memory is coupled to the first and second multiplier-accumulator execution pipelines.

6. The integrated circuit of claim 1 wherein:
the first memory includes a plurality of regions wherein the first multiplier-accumulator execution pipeline writes the first processed data to a first region of the first memory during performance of the first plurality of multiply and accumulate operations and, simultaneously thereto, the second multiplier-accumulator execution pipeline reads the first processed data from the first region of the first memory during performance of the second plurality of multiply and accumulate operations.

7. The integrated circuit of claim 1 wherein:
the plurality of multiplier-accumulator execution pipelines of each processing component are physically organized into a plurality of clusters and the first and second multiplier-accumulator execution pipelines are located in the same cluster.

8. The integrated circuit of claim 1 wherein:
the first multiplier-accumulator execution pipeline, in operation, (i) outputs a first portion of the first processed data to the first memory before the second multiplier-accumulator execution pipeline inputs second data from the first memory and (ii) outputs a second portion of the first processed data to the first memory while the second multiplier-accumulator execution pipeline inputs second data from the first memory.

9. An integrated circuit comprising:
a plurality of processing components, wherein each processing component includes:
first memory to store image data;
a plurality of multiplier-accumulator execution pipelines, coupled to the first memory, wherein each multiplier-accumulator execution pipeline includes a plurality of multiplier-accumulator circuits to, in operation, perform multiply and accumulate operations using data from the first memory and the filter weights; wherein:
a first processing component of the plurality of processing components is configured to process all of the data associated with all of stages of a first image frame via the plurality of multiplier-accumulator execution pipelines of the first processing component, and
a second processing component of the plurality of processing components is configured to process all of the data associated with all of stages of a second image frame via the plurality of multiplier-accumulator execution pipelines of the second processing component, wherein the first processing component processes the data associated with the stages of the first image frame concurrently with respect to the second processing component processing the data associated with the stages of the second image frame and wherein the first image frame and the second image frame are successive image frames; and wherein the first processing component is separate from the second processing component and the first and second processing components are electrically connected.

10. The integrated circuit of claim 9 wherein:
the plurality of multiplier-accumulator execution pipelines of each processing component are organized into a plurality of clusters, wherein each cluster includes a subset of the plurality of multiplier-accumulator execution pipelines.

11. The integrated circuit of claim 9 wherein:
each processing components further includes:
second memory to store the filter weights, wherein the second memory is L1 memory and the first memory is L2 memory.

12. The integrated circuit of claim 11 wherein each of the processing components further includes:
a plurality of third memories to store filter weights, wherein each multiplier-accumulator execution pipeline of the plurality of multiplier-accumulator execution pipelines is associated with a dedicated third memory.

13. The integrated circuit of claim 9 wherein the plurality of multiplier-accumulator execution pipelines of each of the first and second processing components further includes:
a first multiplier-accumulator execution pipeline configured to: (i) input first stage data from the first memory of the associated processing component, (ii) perform a first plurality of multiply and accumulate operations using the first stage data and a first set of filter weights, and (iii) output first processed data to the first memory of the associated processing component, and
a second multiplier-accumulator execution pipeline configured to: (i) input the first processed data, (ii) perform a second plurality of multiply and accumulate operations using the first processed data and a second set of filter weights, and (iii) output second processed data, and
wherein, in operation, the first multiplier-accumulator execution pipeline performs a portion of the first plurality of multiply and accumulate operations concurrently with respect to performance of the second plurality of multiply and accumulate operations by the second multiplier-accumulator execution pipeline.

14. The integrated circuit of claim 13 wherein:
the first multiplier-accumulator execution pipeline, in operation, outputs (i) a first portion of the first processed data to the first memory before the second multiplier-accumulator execution pipeline performs any of the second plurality of multiply and accumulate operations and (ii) a second portion of the first processed data to the first memory while the second multiplier-accumulator execution pipeline performs second plurality of multiply and accumulate operations.

15. The integrated circuit of claim 14 wherein each processing component further includes:
second memory to store the first and second sets of filter weights.

16. An integrated circuit comprising:
a plurality of processing components, wherein each processing component includes:
first memory to store image data;
a plurality of multiplier-accumulator execution pipelines, coupled to the first memory, wherein each multiplier-accumulator execution pipeline includes a plurality of multiplier-accumulator circuits to, in operation, perform multiply and accumulate operations using data from the first memory and filter weights; wherein:
- a first processing component of the plurality of processing components is configured to process all of the data associated with a first subset of stages of a first image frame via the plurality of multiplier-accumulator execution pipelines of the first processing component, and
- a second processing component of the plurality of processing components is configured to process all of the data associated with a second subset of stages of the first image frame via the plurality of multiplier-accumulator execution pipelines of the second processing component, wherein the first processing component processes the data associated with the first subset of stages of the first image frame concurrently with respect to the second processing component processing the data associated with the second subset of stages of a first image frame; and
- wherein the first processing component is separate from the second processing component and the first and second processing components are electrically connected.

17. The integrated circuit of claim 16 wherein:
the first processing component is configured to process all of the data associated with a first subset of the stages of a plurality of the image frames via the plurality of multiplier-accumulator execution pipelines of the first processing component, wherein the first subset of the stages correspond to the same stages of each image frame of the plurality of the image frames; and
the second processing component is configured to process all of the data associated with a second subset of the stages of the plurality of the image frames via the plurality of multiplier-accumulator execution pipelines of the second processing component, wherein the second subset of the stages correspond to the same stages of each image frame of the plurality of the image frames.

18. The integrated circuit of claim 17 wherein the plurality of multiplier-accumulator execution pipelines of each of the first and second processing components includes:
- a first multiplier-accumulator execution pipeline configured to: (i) input first stage data from the first memory of the associated processing component, (ii) perform a first plurality of multiply and accumulate operations using the first stage data and a first set of filter weights, and (iii) output first processed data to the first memory of the associated processing component, and
- a second multiplier-accumulator execution pipeline configured to: (i) input the first processed data, (ii) perform a second plurality of multiply and accumulate operations using the first processed data and a second set of filter weights, and (iii) output second processed data, and
wherein, in operation, the first multiplier-accumulator execution pipeline performs a portion of the first plurality of multiply and accumulate operations concurrently with respect to performance of the second plurality of multiply and accumulate operations by the second multiplier-accumulator execution pipeline.

19. The integrated circuit of claim 18 wherein:
the first multiplier-accumulator execution pipeline, in operation, outputs (i) a first portion of the first processed data to the first memory before the second multiplier-accumulator execution pipeline performs any of the second plurality of multiply and accumulate operations and (ii) a second portion of the first processed data to the first memory while the second multiplier-accumulator execution pipeline performs second plurality of multiply and accumulate operations.

20. The integrated circuit of claim 16 wherein each processing component further includes:
second memory to store the filter weights, wherein the second memory is L1 memory and the first memory is L2 memory.

21. An integrated circuit comprising:
one or more processing components, wherein each processing component includes:
first memory to store image data;
a plurality of multiplier-accumulator execution pipelines, coupled to the first memory, wherein each multiplier-accumulator execution pipeline includes a plurality of multiplier-accumulator circuits to, in operation, perform multiply and accumulate operations, wherein the plurality of multiplier-accumulator execution pipelines includes:
- a first multiplier-accumulator execution pipeline configured to: (i) input first data, (ii) perform a first plurality of multiply and accumulate operations using the first data and a first set of filter weights, and (iii) output first processed data to the first memory, wherein the first processed data are stored therein, and
- a second multiplier-accumulator execution pipeline configured to: (i) input second data from the first memory, wherein the second data includes the first processed data, (ii) perform a second plurality of multiply and accumulate operations using the second data and a second set of filter weights, and (iii) output second processed data;
wherein, in operation:
the first multiplier-accumulator execution pipeline performs a portion of the first plurality of multiply and accumulate operations concurrently with respect to performance of the second plurality of multiply and accumulate operations by the second multiplier-accumulator execution pipeline, and
the first multiplier-accumulator execution pipeline (i) outputs a first portion of the first processed data to the first memory before the second multiplier-accumulator execution pipeline inputs second data from the first memory and (ii) outputs a second portion of the first processed data to the first memory while the second multiplier-accumulator execution pipeline inputs second data from the first memory.

22. The integrated circuit of claim 21 wherein:
first processed data corresponds to a first stage of an image frame and the second processed data corresponds to a second stage of the image frame, wherein the first and second stages are successive stages of the image frame.

23. The integrated circuit of claim 21 wherein:
the first memory is L2 memory.

24. The integrated circuit of claim 21 wherein:
the first memory includes a plurality of regions, including a first region, and wherein the first multiplier-accumulator execution pipeline writes the first processed data to the first region of the first memory during performance of the first plurality of multiply and accumulate operations and, simultaneously thereto, the second multiplier-accumulator execution pipeline reads the first processed data from the first region of the first memory during performance of the second plurality of multiply and accumulate operations.

25. The integrated circuit of claim 21 wherein:
the first memory includes a plurality of regions, including a first region, and
wherein the first region of the first memory is simultaneously used to (i) store the first processed data output by the first multiplier-accumulator execution pipeline and (ii) output the second data, including the first processed data, to the second multiplier-accumulator execution pipeline during performance of the first plurality of multiply and accumulate operations by the first multiplier-accumulator execution pipeline and second plurality of multiply and accumulate operations by the second multiplier-accumulator execution pipeline.

26. The integrated circuit of claim 21 further including:
second memory to store the first set of filter weights and the second set of filter weights, wherein the second memory is coupled to the first and second multiplier-accumulator execution pipelines.

27. The integrated circuit of claim 26 wherein:
wherein the second memory is L1 memory and the first memory is L2 memory.

28. The integrated circuit of claim 26 further including:
a plurality of third memories to store filter weights, wherein each multiplier-accumulator execution pipeline of the plurality of multiplier-accumulator execution pipelines is associated with a dedicated third memory.

29. The integrated circuit of claim 21 wherein:
the plurality of multiplier-accumulator execution pipelines of each processing component are physically organized into a plurality of clusters and the first and second multiplier-accumulator execution pipelines are located in the same cluster.

* * * * *